(12) United States Patent
Ludwig et al.

(10) Patent No.: US 9,823,160 B2
(45) Date of Patent: Nov. 21, 2017

(54) APPARATUS AND METHODS FOR TESTING SUCTION CUPS MOUNTED TO A TRACK

(71) Applicant: The Boeing Company, Chicago, IL (US)

(72) Inventors: Scott Alan Ludwig, Marysville, WA (US); Derek Mickelson, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 182 days.

(21) Appl. No.: 14/677,647

(22) Filed: Apr. 2, 2015

(65) Prior Publication Data

US 2016/0290888 A1   Oct. 6, 2016

(51) Int. Cl.
*G01M 3/26* (2006.01)
*G01M 3/34* (2006.01)

(52) U.S. Cl.
CPC .................................... *G01M 3/34* (2013.01)

(58) Field of Classification Search
CPC .. Y10S 294/907; Y10S 901/40; Y10S 901/46; B66C 1/0218; G01M 3/26
See application file for complete search history.

(56) References Cited

U.S. PATENT DOCUMENTS

| | | | |
|---|---|---|---|
| 4,517,826 A * | 5/1985 | Cole | G01M 3/26 73/40 |
| 5,188,411 A * | 2/1993 | Golden | B65G 47/91 137/487.5 |
| 5,191,218 A * | 3/1993 | Mori | G03F 7/707 250/453.11 |
| 5,609,377 A * | 3/1997 | Tanaka | B65G 47/918 294/65 |
| 7,677,622 B2 * | 3/2010 | Dunkmann | B65G 47/917 294/188 |
| 8,122,776 B2 * | 2/2012 | Fox | B66C 1/0218 73/49.8 |
| 8,577,649 B2 * | 11/2013 | Suyama | G05B 23/0232 703/2 |
| 8,855,818 B2 * | 10/2014 | Hashimoto | B25J 13/087 700/245 |
| 9,205,558 B1 * | 12/2015 | Zevenbergen | B25J 9/1664 |
| 9,230,682 B2 * | 1/2016 | Mirican | G11C 29/02 |
| 9,468,378 B2 * | 10/2016 | Lynn | A61B 5/00 |
| 9,476,794 B2 * | 10/2016 | Pavlik | G01M 3/26 |
| 2008/0163675 A1 * | 7/2008 | Hsu | G01M 3/2869 73/40 |
| 2011/0166704 A1 * | 7/2011 | Hashimoto | B25J 13/087 700/250 |
| 2013/0024172 A1 * | 1/2013 | Suyama | G05B 23/0232 703/2 |
| 2016/0332837 A1 * | 11/2016 | Richards | B65H 29/241 |

* cited by examiner

*Primary Examiner* — Freddie Kirkland, III
(74) *Attorney, Agent, or Firm* — MH2 Technology Law Group, LLP

(57) ABSTRACT

An apparatus (100) for testing suction cups (138) mounted on a track (162) is disclosed. The apparatus (100) comprises a base (102) comprising a first surface (104) and a second surface (106) opposite the first surface (104). The apparatus further comprises ports (108) penetrating the base (102) from the first surface (104) to the second surface (106) and vacuum sensors (112) pneumatically coupled to the ports (108). The ports (108) in the base (102) are arranged in a geometric pattern (110).

21 Claims, 16 Drawing Sheets

APPARATUS AND METHODS FOR TESTING SUCTION CUPS MOUNTED TO A TRACK

BACKGROUND

Suction cup rails, comprising suction cups mounted on tracks, are used to support automated machinery in various orientations above ground level for performing a variety of manufacturing operations. The suction cups of the rails are periodically tested to insure proper functionality. However, conventional methods and apparatus for testing suction cups mounted on a rail are generally inefficient. More specifically, testing individual suction cups of each rail sequentially is tedious and time consuming, especially in view of the need to initialize test conditions, record results, and convert such results into usable data.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to an apparatus for testing suction cups mounted on a track. The apparatus comprises a base comprising a first surface and a second surface opposite the first surface. The apparatus further comprises ports penetrating the base from the first surface to the second surface and vacuum sensors pneumatically coupled to the ports. The ports in the base are arranged in a geometric pattern.

Another example of the present disclosure relates to a method of testing suction cups mounted on a track. The method comprises: generating a vacuum in at least one of the suction cups while fluid-communication paths between the suction cups and vacuum sensors concurrently exist. The method further comprises collecting signals from the vacuum sensors.

BRIEF DESCRIPTION OF THE DRAWINGS

Figure 1:
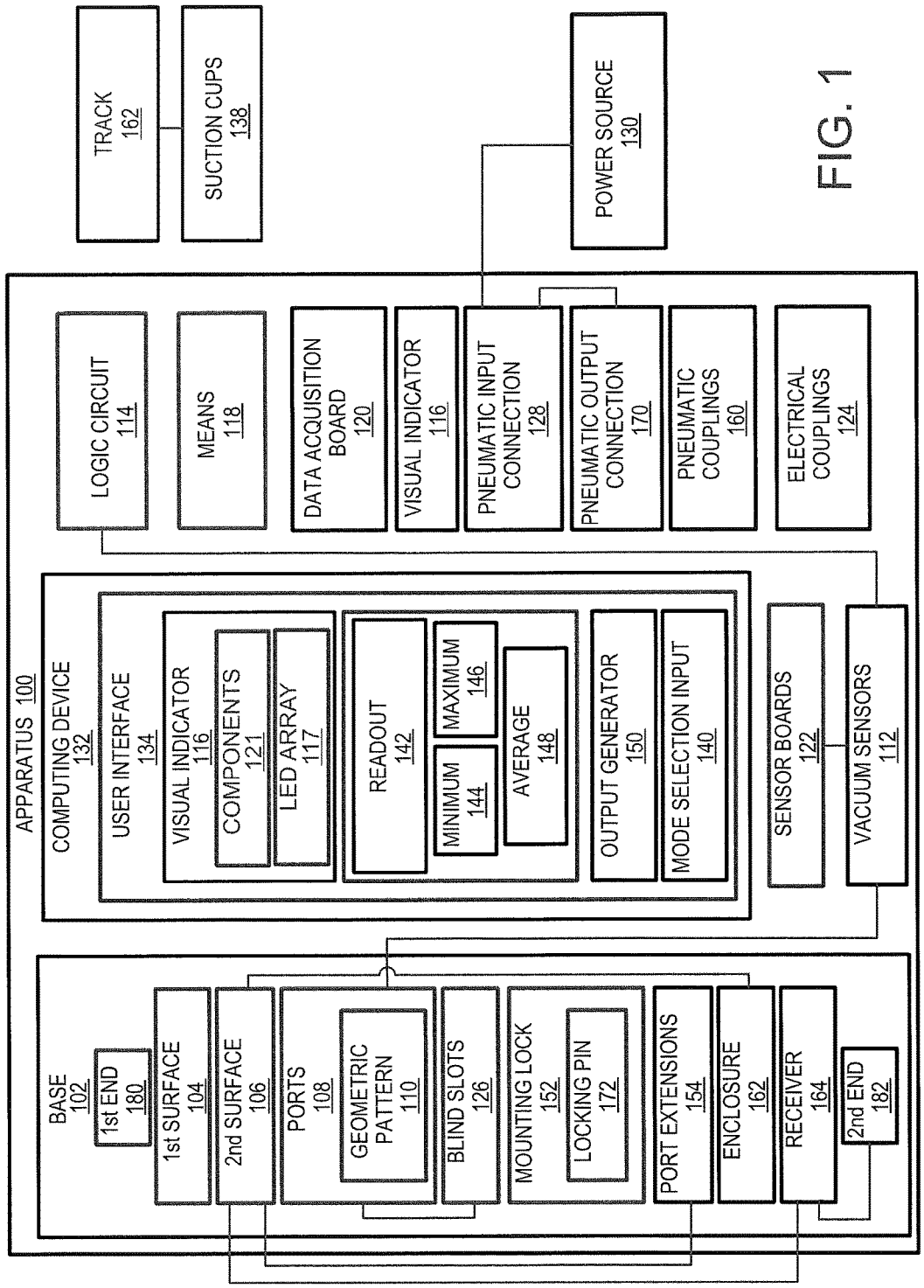
Figure 2:
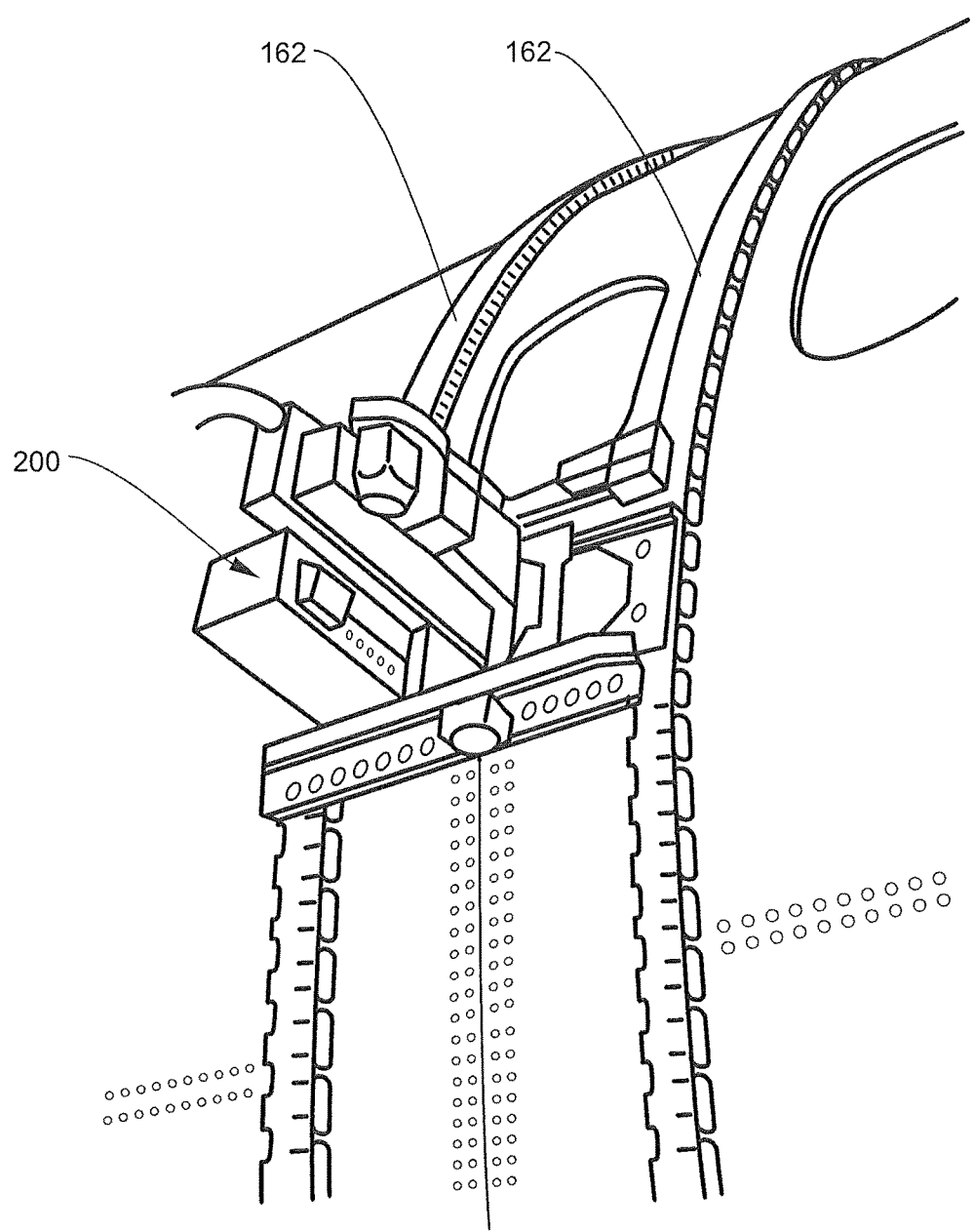
Figure 3:
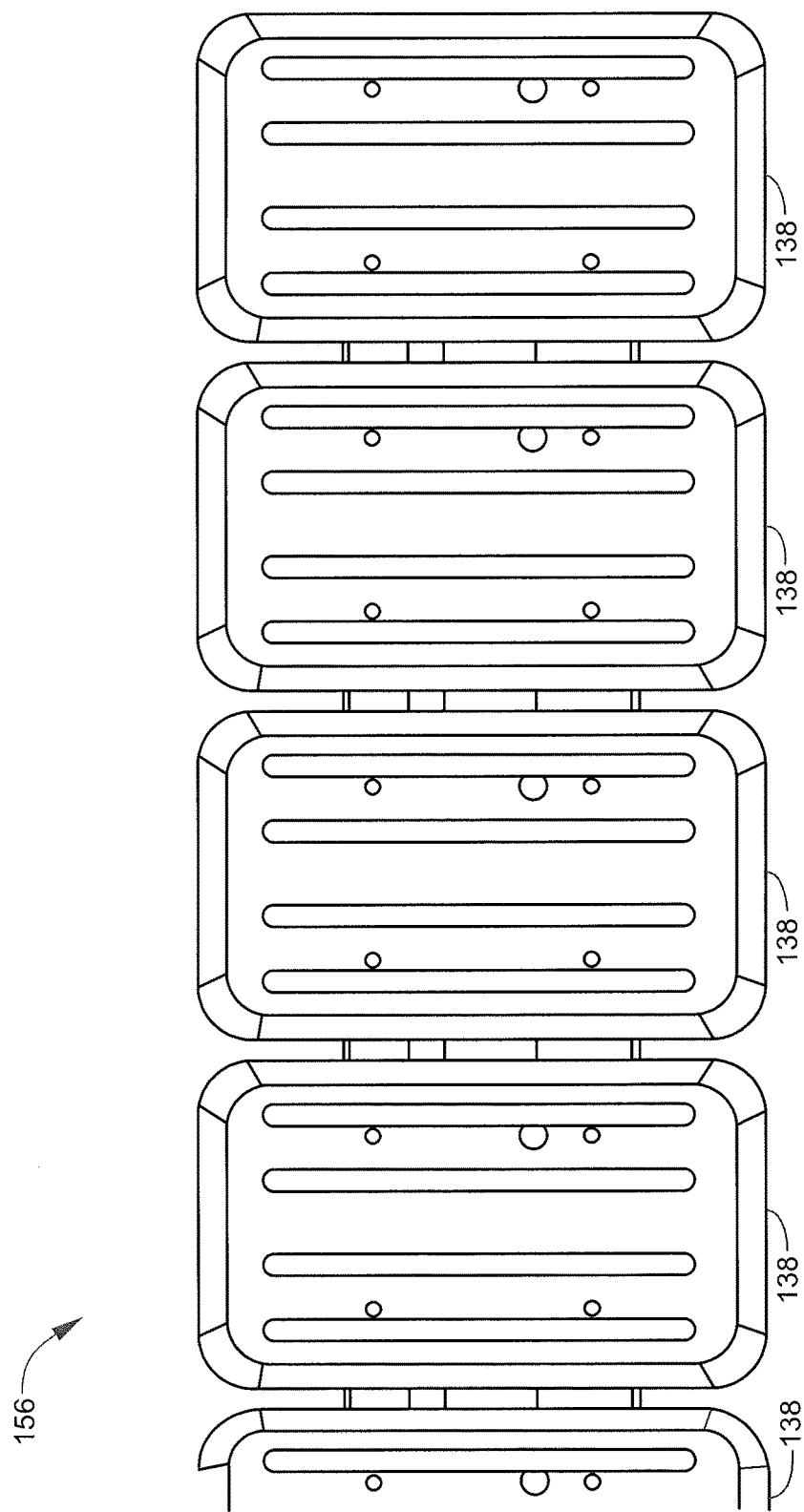
Figure 4:
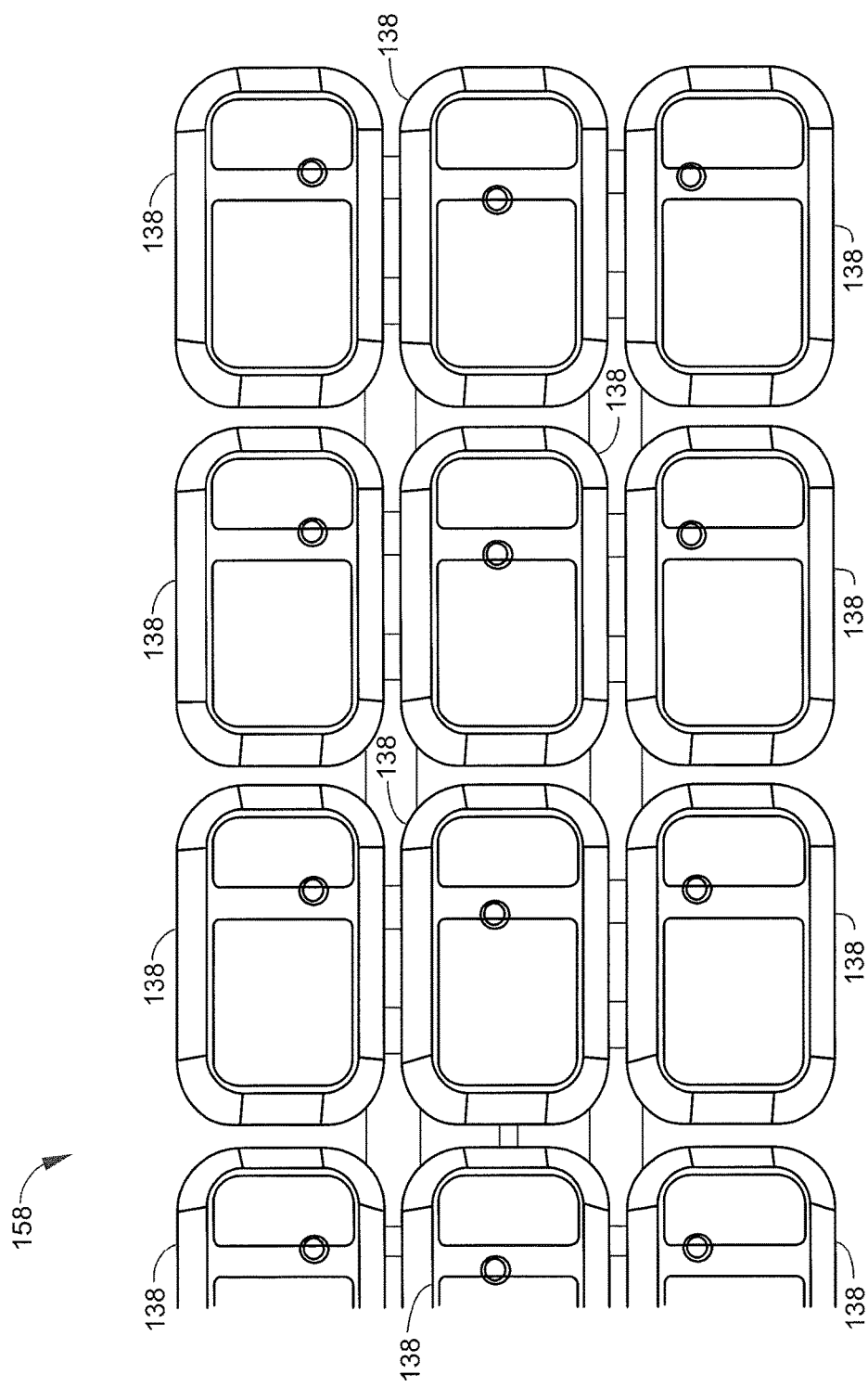
Figure 5:
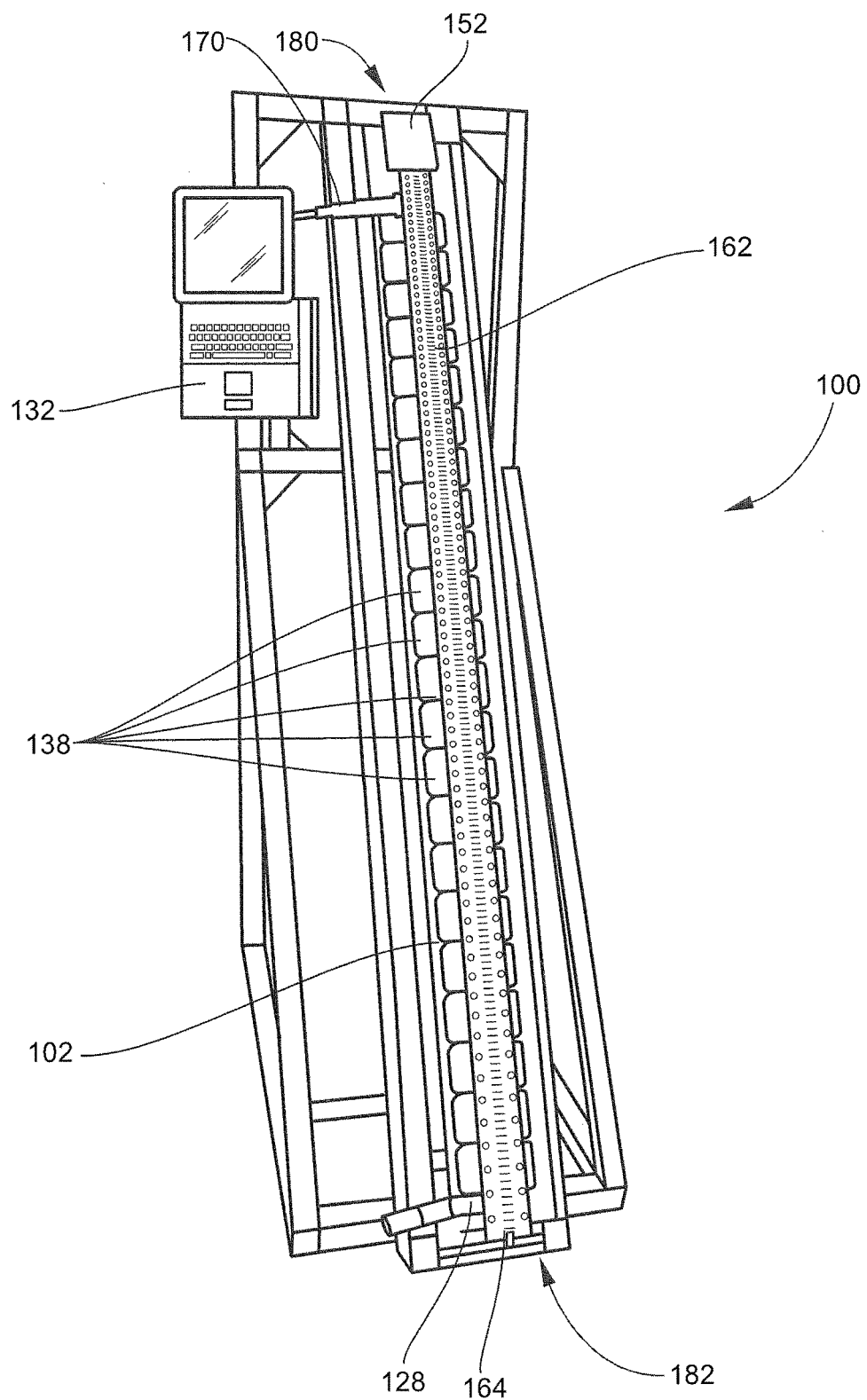
Figure 6:
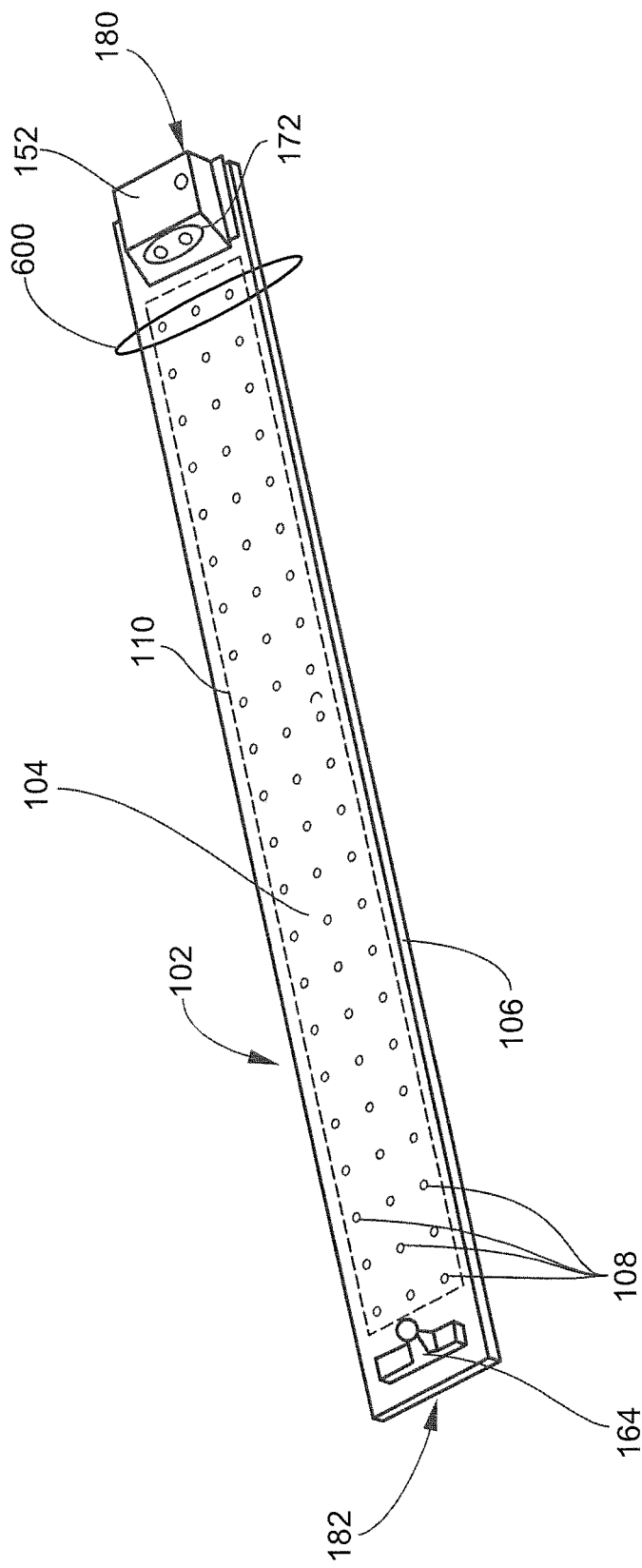
Figure 7:
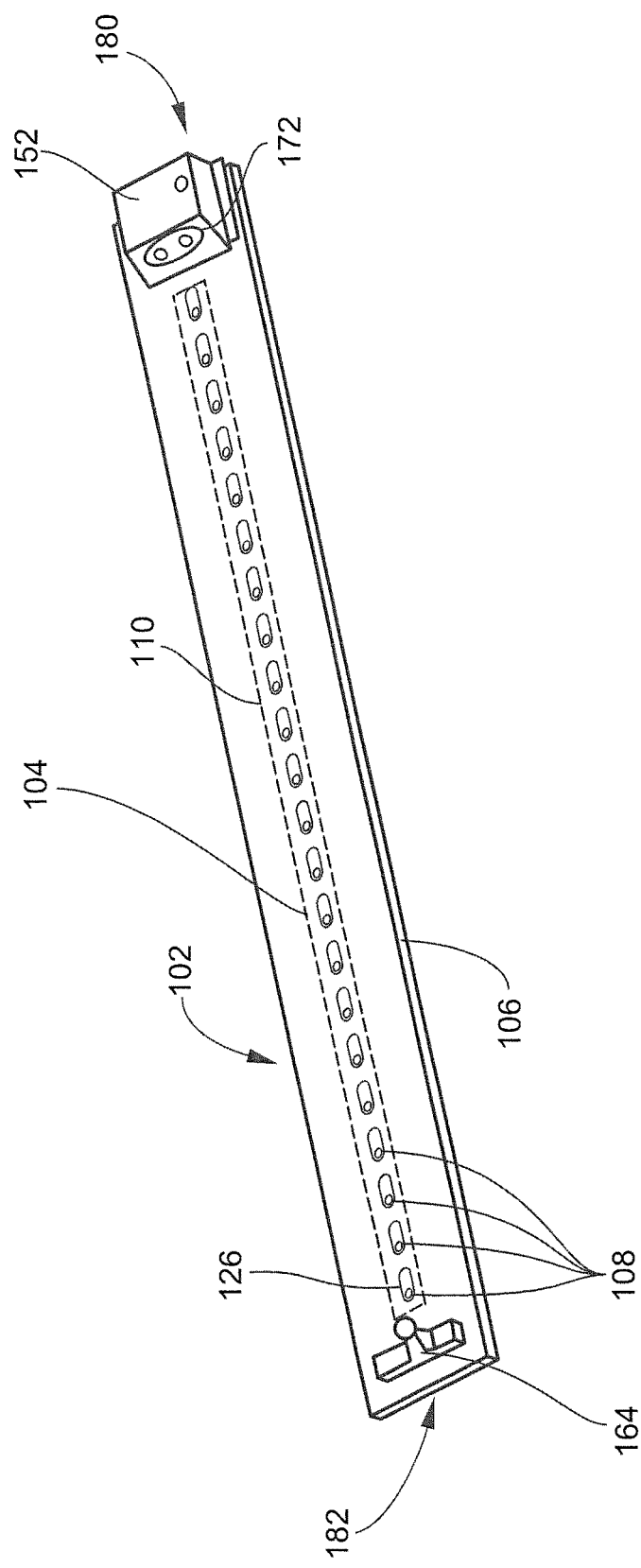
Figure 8:
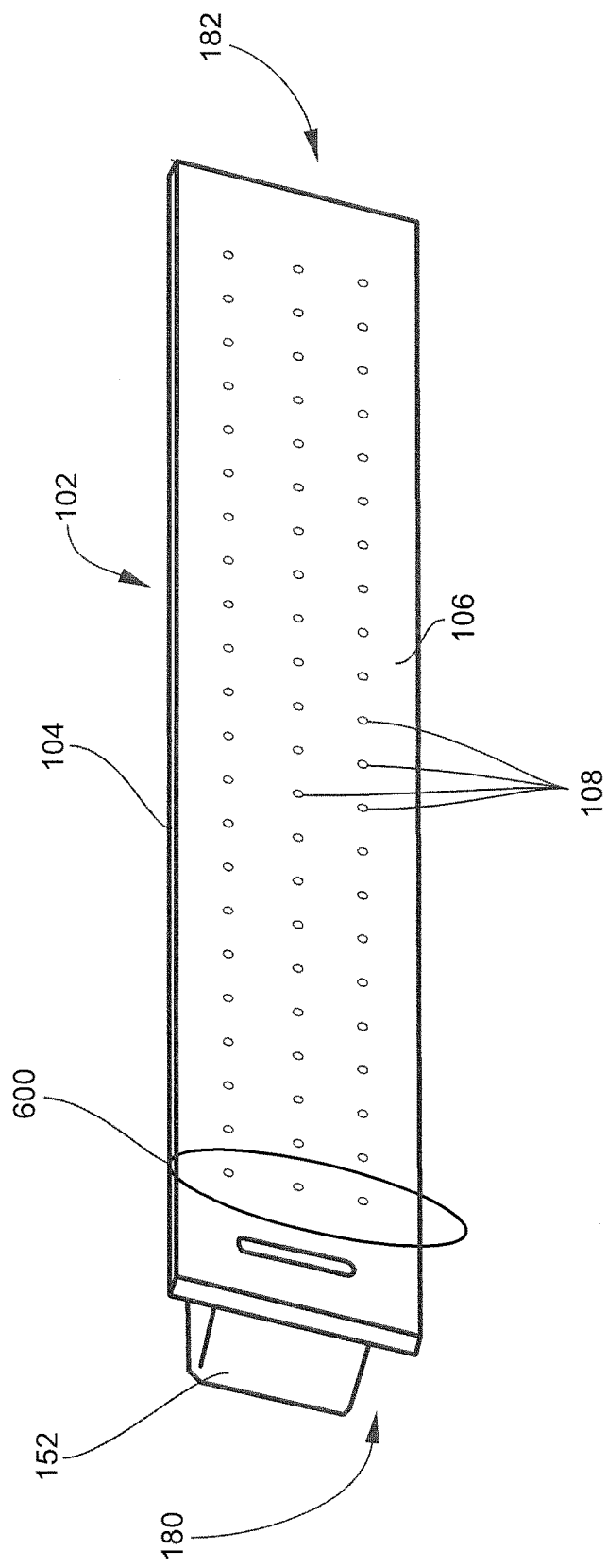
Figure 9:
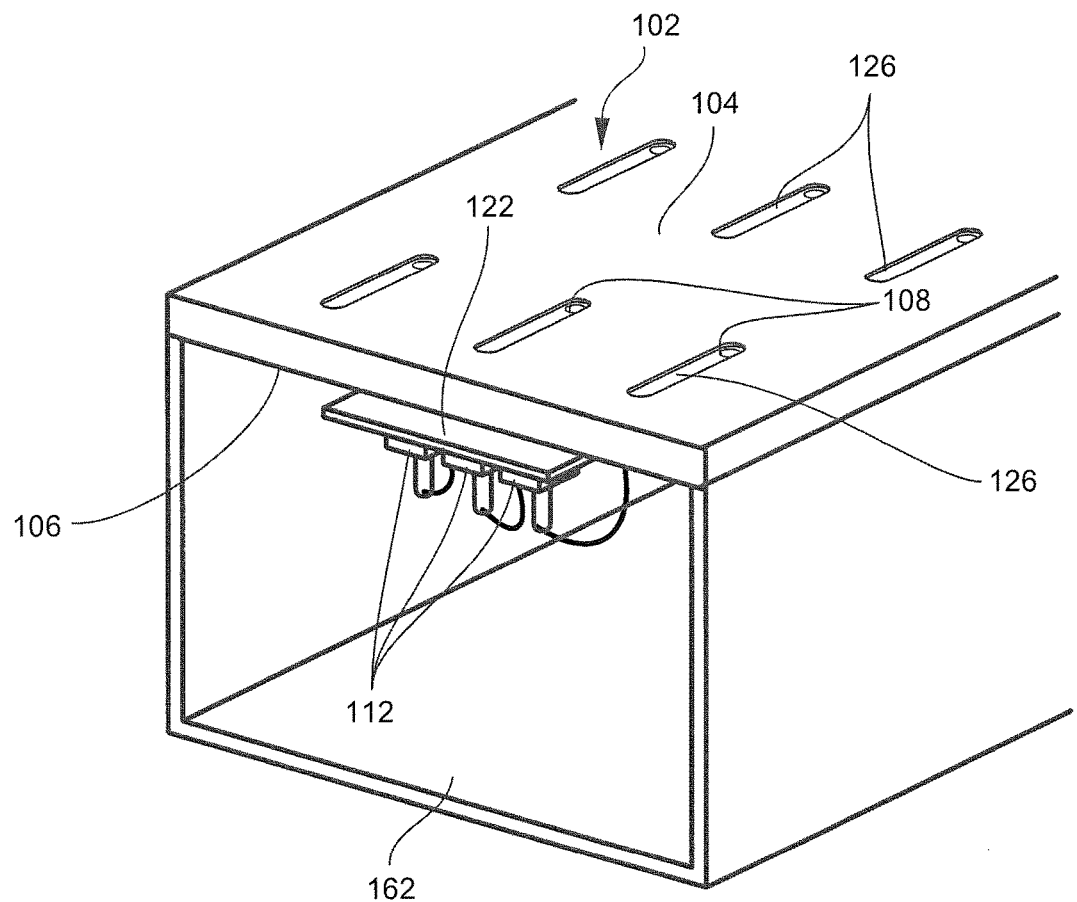
Figure 10:
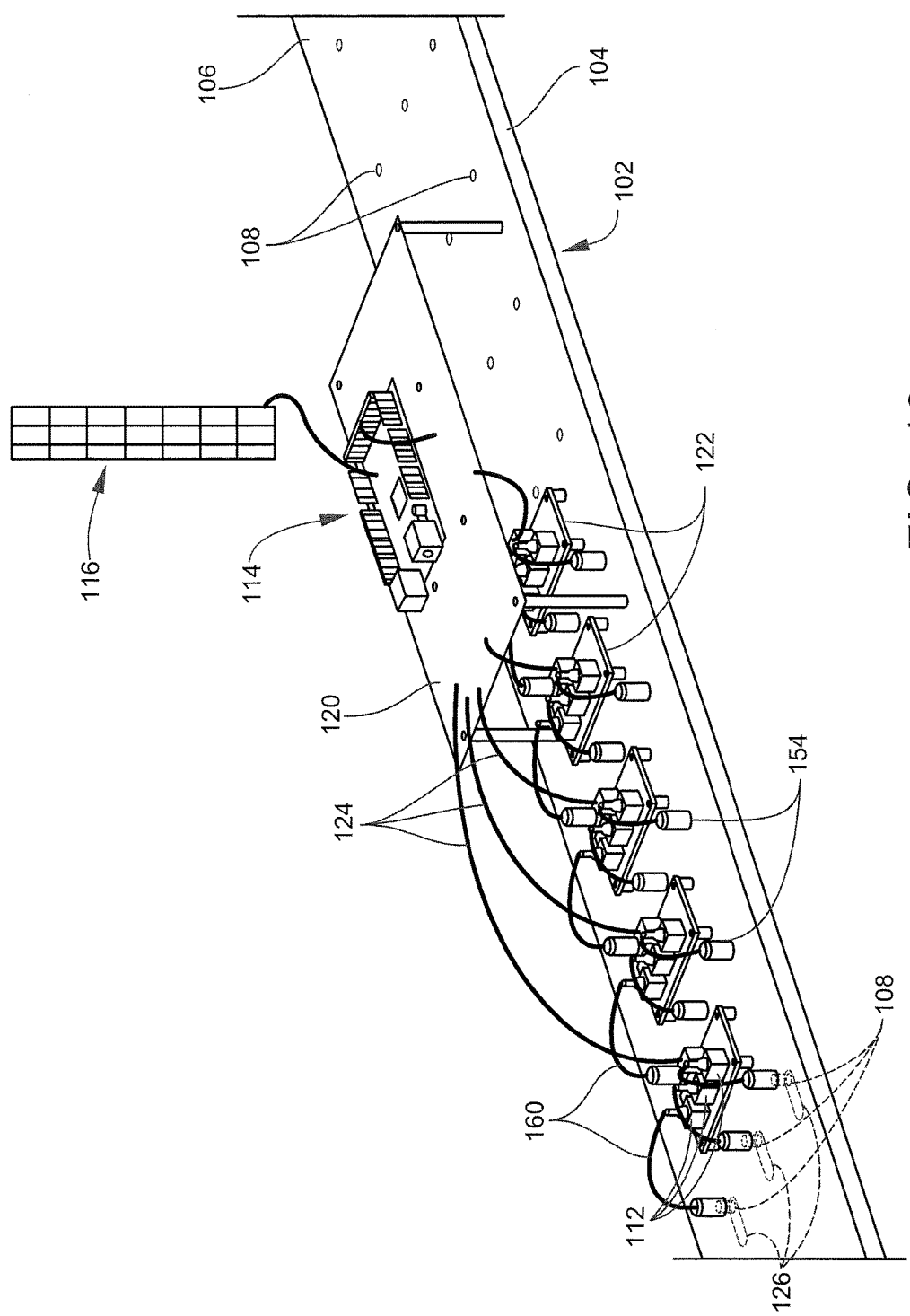
Figure 11:
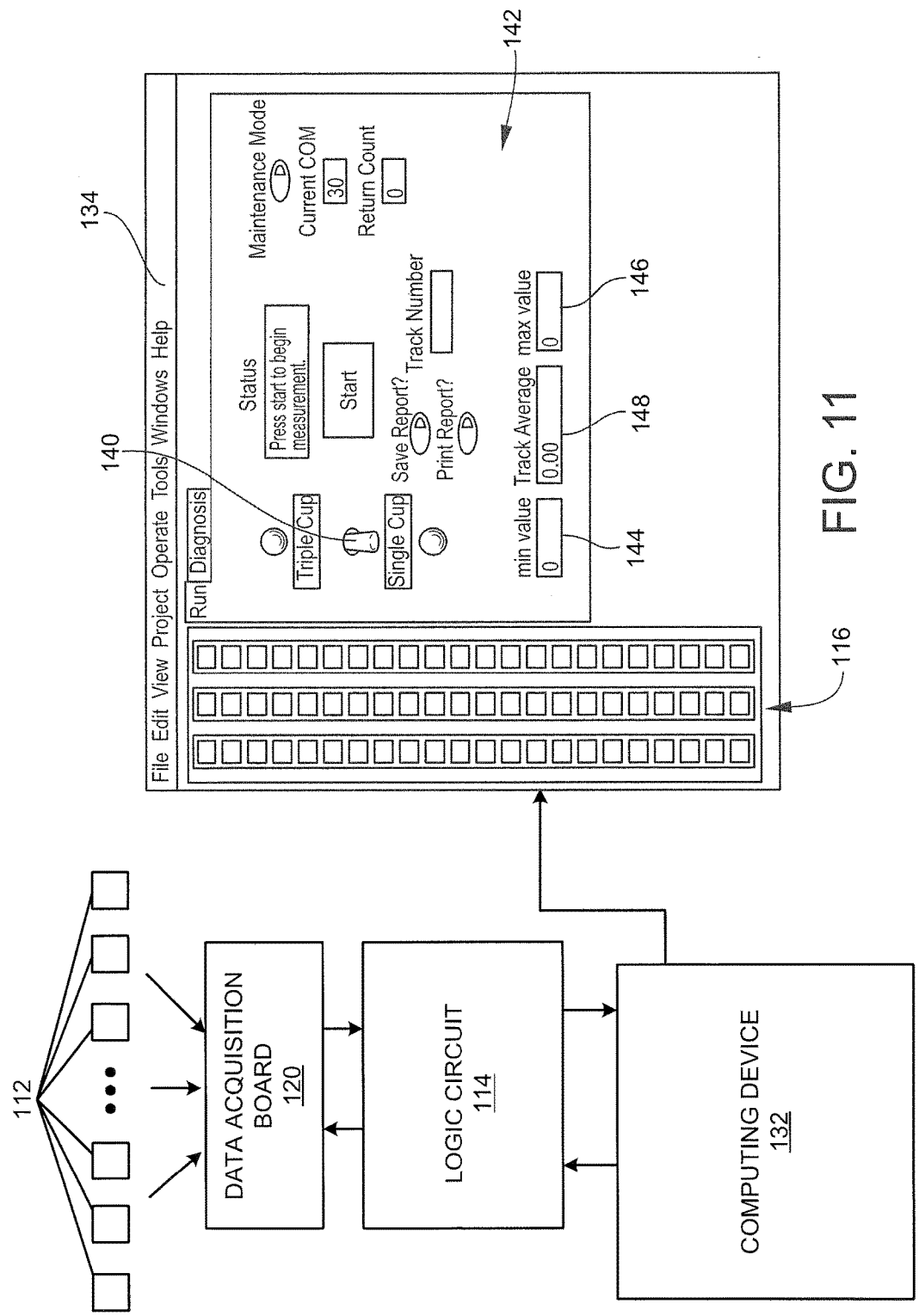

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an apparatus for testing suction cups mounted on a track, according to one or more examples of the present disclosure;

FIG. 2 is a schematic, environmental perspective view of suction-cup rails attached to an airplane fuselage and supporting a precision drilling machine, according to one or more examples of the present disclosure;

FIG. 3 is a schematic, elevational view of a suction-cup rail wherein the suction cups comprise a single-cup arrangement, according to one or more examples of the present disclosure;

FIG. 4 is a schematic, elevational view of a suction-cup rail wherein the suction cups comprise a triple-cup arrangement, according to one or more examples of the present disclosure;

FIG. 5 is a schematic, perspective view of the apparatus of FIG. 1 with a suction-cup rail installed thereon, according to one or more examples of the present disclosure;

FIG. 6 is a schematic, perspective view of a track of the apparatus of FIG. 1, according to one or more examples of the present disclosure;

FIG. 7 is a schematic, perspective view of a track of the apparatus of FIG. 1, according to one or more examples of the present disclosure;

FIG. 8 is a schematic perspective view of a track of the apparatus of FIG. 1, according to one or more examples of the present disclosure;

FIG. 9 is a schematic, sectional perspective view of a portion of the apparatus of FIG. 1, according to one or more examples of the present disclosure;

FIG. 10 is a schematic, sectional perspective view of a portion of the apparatus of FIG. 1, according to one or more examples of the present disclosure;

FIG. 11 is a schematic, partial block diagram of a portion of the apparatus of FIG. 1, according to one or more examples of the present disclosure.

Figure 12A:
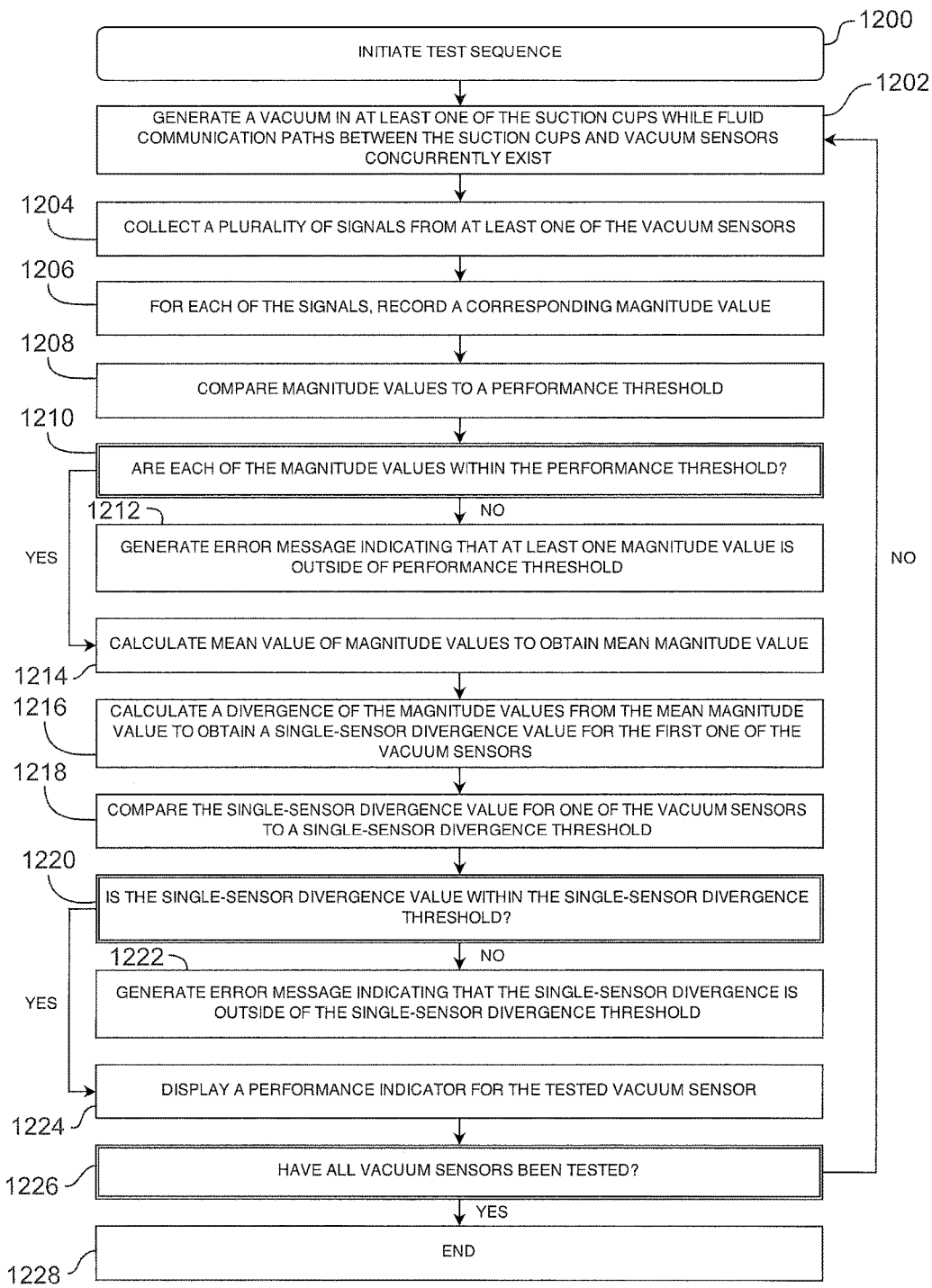
Figure 12B:
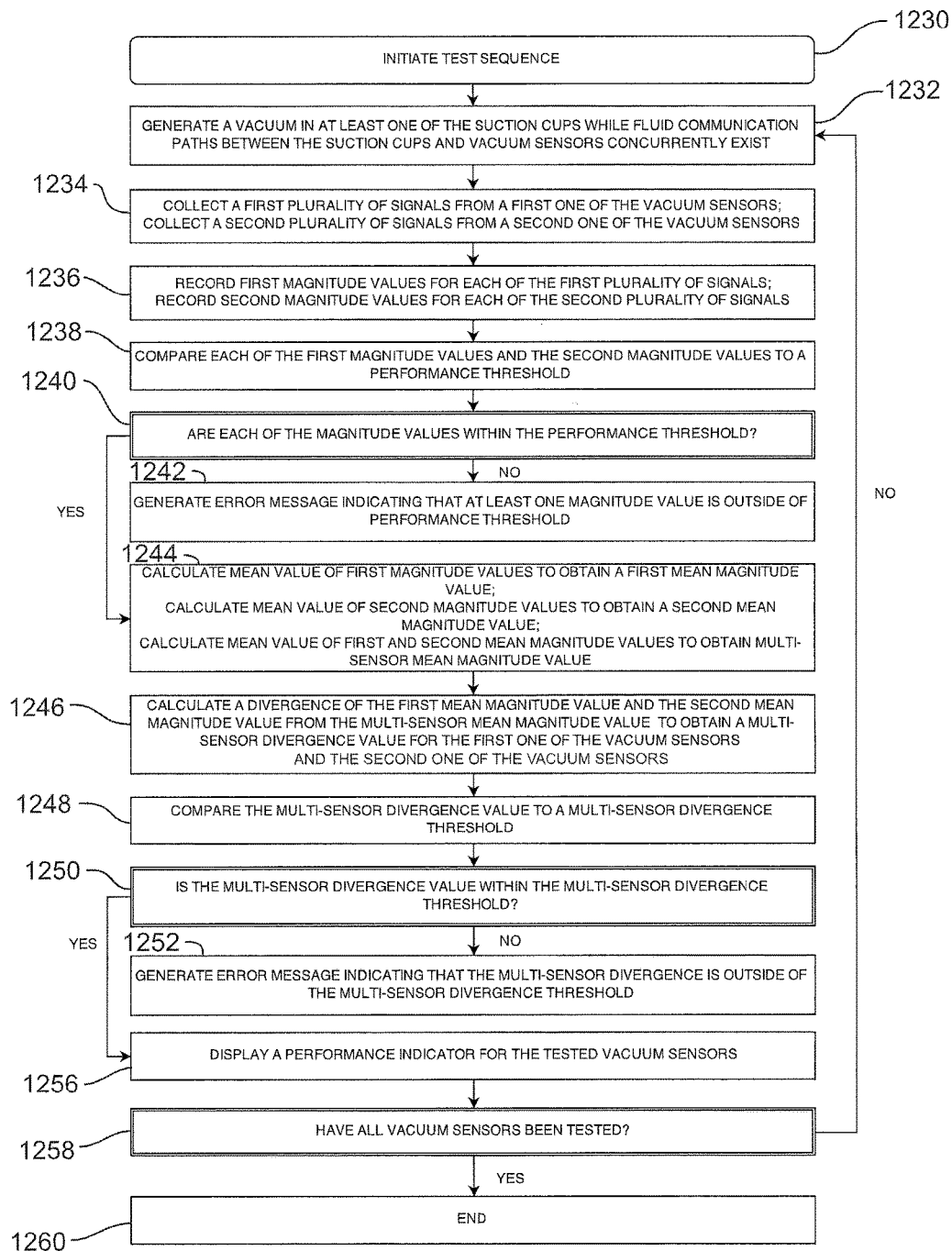
Figure 13:
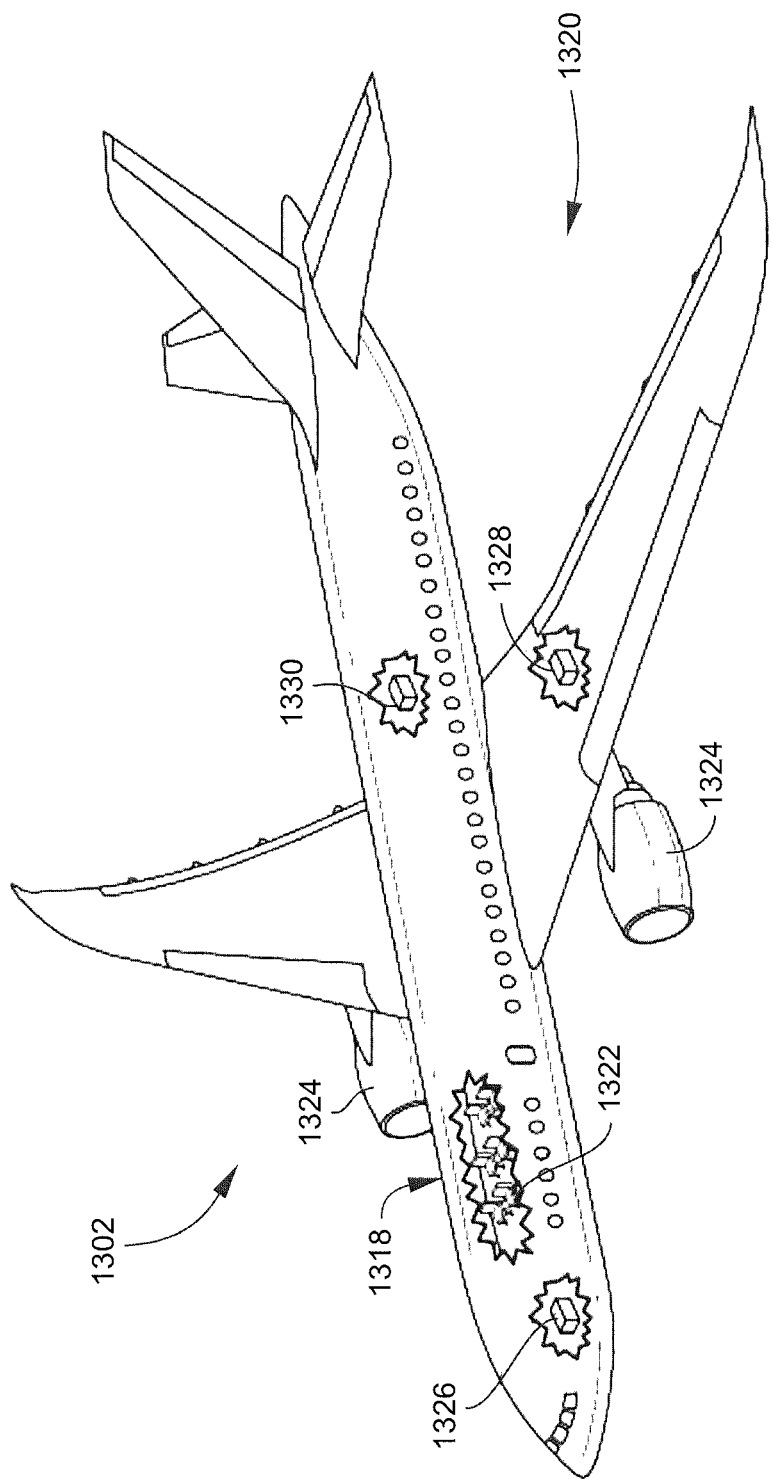

FIG. 12A is a block diagram of a method of testing suction cups mounted to a track, according to one or more examples of the present disclosure;

FIG. 12B is a block diagram of a method of testing suction cups mounted to a track, according to one or more examples of the present disclosure;

FIG. 13 is a schematic illustration of an aircraft.

Figure 14:
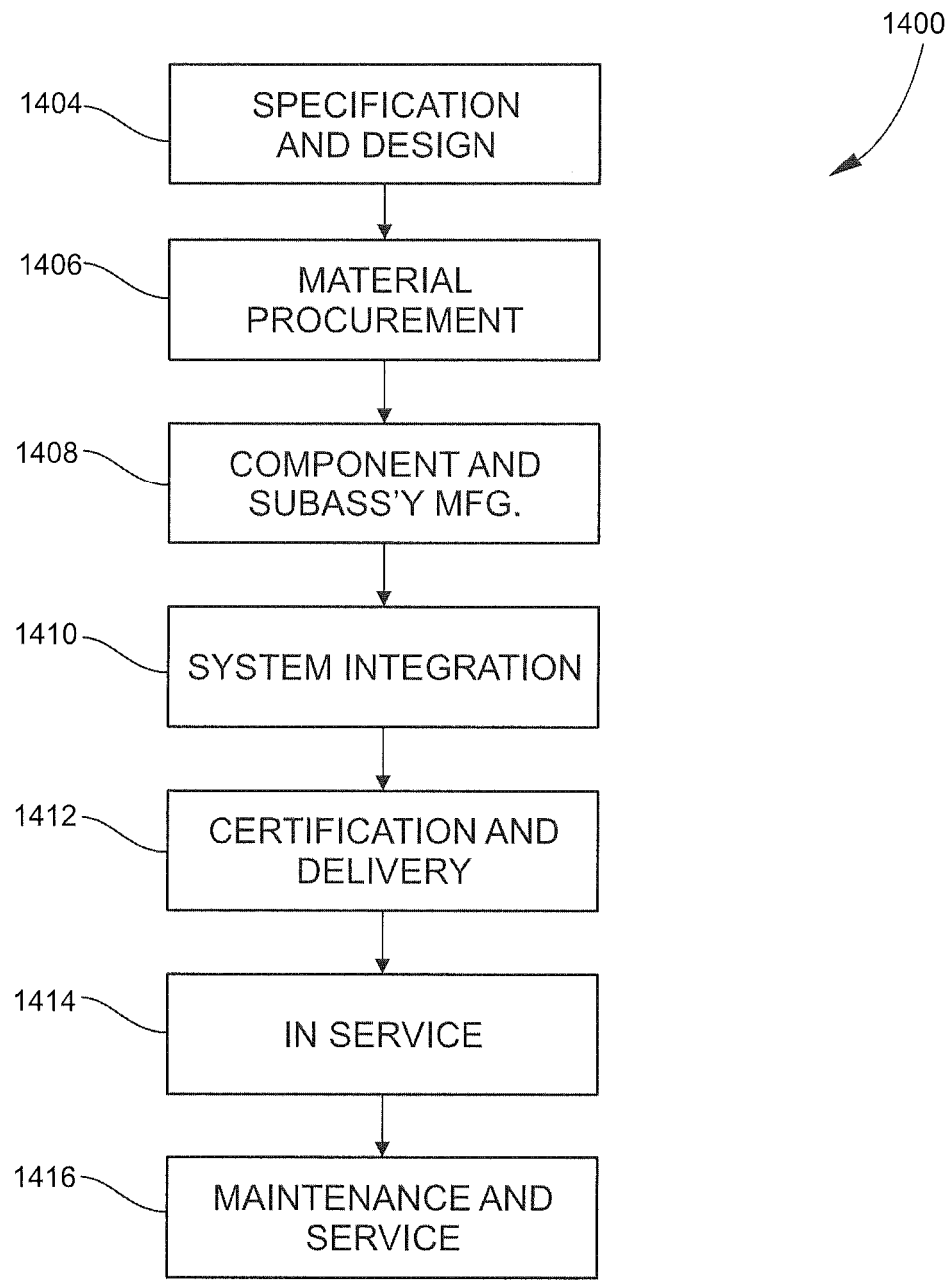
Figure 15:
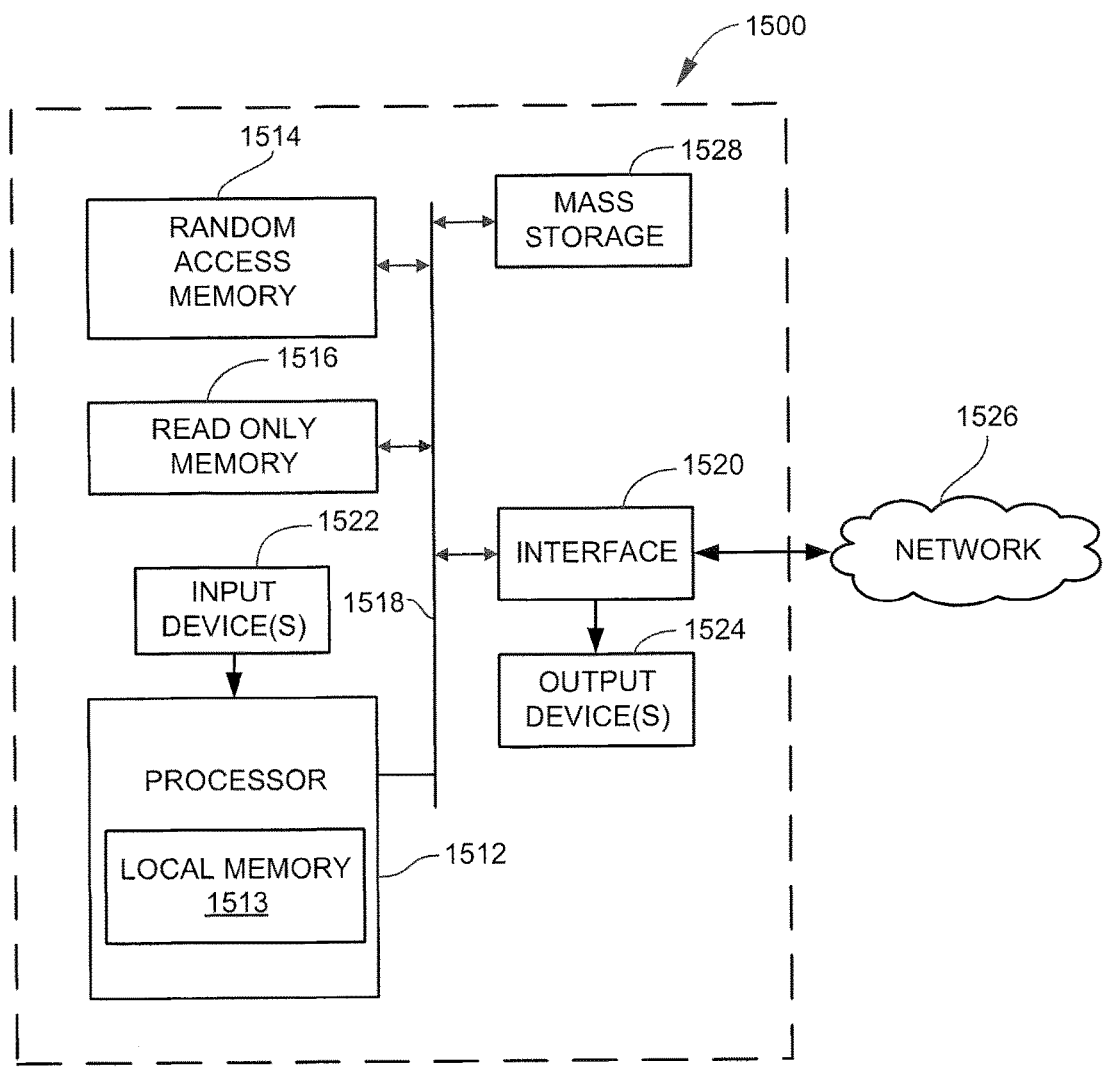

FIG. 14 is a block diagram of aircraft production and service methodology; and FIG. 15 is a block diagram of a computer which may be operable to carry out one or more steps of methods according to one or more examples of the present disclosure.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 12A, 12B, and 14 referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12A, 12B, and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, any means-plus-function clause is to be interpreted under 35 U.S.C. 112(f), unless otherwise explicitly stated. It should be noted that examples provided herein of any structure, material, or act in support of any means-plus-function clause, and equivalents thereof, may be utilized individually or in combination. Thus, while various structures, materials, or acts may be described in connection with a means-plus-function clause, any combination thereof or of their equivalents is contemplated in support of such means-plus-function clause.

Illustrative, non-exhaustive examples, which may or may not be claimed, of the subject matter according the present disclosure are provided below.

Referring to FIG. 1 and particularly to e.g. FIGS. 5-10, apparatus 100 for testing suction cups 138 mounted on track 162 is disclosed. Apparatus 100 comprises base 102 comprising first surface 104 and second surface 106 opposite first surface 104. Apparatus 100 further comprises ports 108 penetrating base 102 from first surface 104 to second surface 106 and vacuum sensors 112 are pneumatically coupled to ports 108. Ports 108 in base 102 are arranged in geometric pattern 110. The preceding subject matter of this paragraph is characterizes example 1 of the present disclosure.

Multiple suction cups 138 mounted on track 162 can be assessed and/or compared to predetermined performance thresholds or tolerances. Demands on worker time and attention are thus decreased.

Apparatus 100 consistent with the present disclosure can have any shape, form, size, or other configurations or dimensions not inconsistent with the objectives of the present disclosure. First surface 104 and second surface 106 are opposite one another. However, such configuration is not intended to limit first surface 104 and second surface 106 to be parallel to one another. Rather, first surface 104 and second surface 106 may only be on opposing sides of base 102, and may have varying or differing shapes or orientations while maintaining opposing disposition.

Referring generally to FIG. 1 and particularly to e.g. FIG. 11, apparatus 100 further comprises logic circuit 114 in communication with vacuum sensors 112. The preceding subject matter of this paragraph characterizes example 2 of the present disclosure, wherein example 2 includes the subject matter of example 1, above.

Logic circuits 114 can control receipt and/or calculation of data. Additionally, logic circuits 114 can permit automation of signal transfer and/or control of individual components. As such, larger and/or more complex sample sets and/or trials may be processed than in worker-controlled apparatus 100.

As used herein, the term "logic circuit" refers to devices such as multiplexers, registers, arithmetic logic units (ALUs), and computer memory. However, the term "logic circuit" is not intended to be limited to the foregoing specifically enumerated devices. For example, any logic circuit not inconsistent with the objectives of the present disclosure can be used, such as complete microprocessors and the like.

Referring generally to FIG. 1 and particularly to e.g. FIG. 11, apparatus 100 further comprises means 118 for causing logic circuit 114 to select a mode of receiving signals from vacuum sensors 112. The preceding subject matter of this paragraph characterizes example 3 of the present disclosure, wherein example 3 includes the subject matter of example 2, above.

Means 118 for causing logic circuit 114 to select a mode of receiving signals from vacuum sensors 112 can permit a worker or operator to measure, diagnose, or otherwise examine one or more of vacuum sensors 112, suction cups 138, or combinations thereof. Additionally, such means 118 can permit selection of modes which may measure all of vacuum sensors 112 and/or suction cups 138 or some subset of the same.

Any means not inconsistent with the objectives of the present disclosure can be used. For example, in some implementations, means 118 for causing logic circuit 114 to select a mode can be a controller. A "controller," for reference purposes herein, can be a hardware controller or a software controller. The controller can be a computer or other apparatus including hardware, alone or under direction of one or more computer program code instructions, program instructions or executable computer-readable program code instructions from a computer-readable storage medium. The controller of a system described herein may be connected to or otherwise in communication with one or more other components of apparatus 100. Further, the controller can be configured to direct, coordinate, or control the operation of various other components of the system, including in response to user input and/or to provide an object corresponding to design data accessed by the controller. A controller therefore, as referenced herein, refers to a device (hardware or software) by which the user or worker controls operation of logic circuit 114. In one non-limiting example, means 118 can be a software toggle or switch and/or a hardware toggle or switch operable to cause logic circuit 114 to select a mode of receiving signals from vacuum sensors 112.

Referring generally to FIG. 1 and particularly to e.g. FIGS. 3, 4, 6 and 7, the mode of receiving signals from vacuum sensors 112 is one of receiving signals from at least two vacuum sensors 112 in fluid communication with one suction cup 138 or receiving signals from vacuum sensors 112 with each of the vacuum sensors 112 in fluid communication with a single one of suction cups 138. The preceding subject matter of this paragraph characterizes example 4 of the present disclosure, wherein example 4 includes the subject matter of example 3, above.

Receiving signals from at least two vacuum sensors 112 in fluid communication with one suction cup 138 can permit multiple readings in multiple locations to be taken from within a single suction cup, either concurrently or sequentially. Receiving signals from individual vacuum sensors 112 in fluid communication with a corresponding single one of suction cups 138 can permit individual readings from multiple suction cups, either concurrently or sequentially.

FIGS. 3 and 4 each illustrate one configuration in which suction cups 138 can be arranged consistent with example 4. In some implementations, as illustrated in FIG. 3, suction cups 138 can have a width spanning across multiple ports 108 pneumatically coupled to multiple vacuum sensors 112, as in the implementation of FIG. 6. Alternatively, such a configuration can be used with apparatus 100 of FIG. 7, wherein a single port 108 pneumatically coupled to a single vacuum sensor 112 is paired with a single suction cup 138. In FIG. 4, suction cups 138 are sized and/or oriented such that fluid communication paths between individual ports 108 pneumatically coupled to individual vacuum sensors 112.

Referring generally to FIG. 1 and particularly to e.g. FIGS. 10 and 11, apparatus 100 further comprises visual indicator 116 in communication with logic circuit 114. Visual indicator 116 is configurable responsive to at least one signal received by logic circuit 114 from at least one of vacuum sensors 112. The preceding subject matter of this paragraph characterizes example 5 of the present disclosure, wherein example 5 includes the subject matter of any of examples 3 and 4, above.

Visual indicator 116 in communication with logic circuit 114 can permit visible display of data or visible display of indications representative of data. Such data can be a direct measurement or corresponding output of the received signals or may be a calculated value based on such signals.

Referring generally to FIG. 1 and particularly to e.g. FIGS. 10 and 11, visual indicator 116 comprises components 121 individually configurable to one of a plurality of states responsive to at least one signal received by logic circuit 114 from at least one of vacuum sensors 112. The preceding subject matter of this paragraph characterizes example 6 of the present disclosure, wherein example 6 includes the subject matter of example 5, above.

Components 121 individually configurable to one of a plurality of states can permit varying visible indications based on performance readiness or other indications based upon received signals or calculated metrics determined from such signals.

Any indicators not inconsistent with the present disclosure can be used. In one non-limiting example, states can include a "fail" or "non-ready" indicator, a "near-threshold" indicator, and/or a "high-performance" or "ready" indicator. Additionally, at least one of the plurality of states can comprise or include a numerical value.

Referring generally to FIG. 1, each of the plurality of states of each of components 121 comprises a specific color. The preceding subject matter of this paragraph characterizes example 7 of the present disclosure, wherein example 7 includes the subject matter of example 6, above.

In instances in which each of the plurality of states of each of components 121 comprises a specific color, a worker or other operator may be able to easily distinguish non-ready or non-working suction cups 138 and/or vacuum sensors 112 from working or ready suction cups 138 and/or vacuum sensors.

Any color or combinations of colors can be used for individual states or for combinations of states. For example, in some implementations, a first state can be represented by red, a second state can be represented by yellow, and/or a third state can be represented by red.

Referring generally to FIG. 1 and particularly to e.g. FIGS. 10 and 11, visual indicator 116 comprises LED array 117. The preceding subject matter of this paragraph characterizes example 8 of the present disclosure, wherein example 8 includes the subject matter of any of examples 5-7, above.

LED arrays 117 can be used to display individual states in a variety of schemes, including text, color, or the like.

An "LED," or "light-emitting diode," for reference purposes herein, can be any semiconductor device that emits visible light when an electric current is passes through the LED. For example, an LED may comprise or consist of pn-junction diode which emits lights when activated. An LED array 117, therefore, can comprise or include any ordered or predetermined arrangement of such light-emitting devices.

Referring generally to FIG. 1 and particularly to e.g. FIG. 11, apparatus 100 further comprises user interface 134. Visual indicator 116 is an element of user interface 134. The preceding subject matter of this paragraph characterizes example 9 of the present disclosure, wherein example 9 includes the subject matter of any of examples 5-7, above.

User interface 134 can permit the ordered reading, interpretation, display, and/or manipulation of data outputs, measured signals, or the like. An apparatus comprising user interface 134, therefore, can permit increased worker organization and/or reduced worker time expenditures when testing suction cups 138.

Any user interface 134 can be used. For example, user interface 134 can comprise or include any number of individual elements. A non-limiting example of one such individual element is described herein below in example 10.

Referring generally to FIG. 1 and particularly to e.g. FIG. 11, user interface 134 further comprises at least one readout 142. The preceding subject matter of this paragraph characterizes example 10 of the present disclosure, wherein example 10 includes the subject matter of example 9, above.

Apparatus 100 comprising user interface 134 comprising at least one readout 142 can permit a worker to determine input or output signals associated with methods carried out utilizing apparatus 100.

A "readout" or visual record or display of the output from an instrument such as apparatus 100 can comprise or include any individual elements arranged in any configuration or orientation not inconsistent with the objectives of the present disclosure. FIG. 11 illustrates one such non-limiting implementation, however other configurations are also possible.

Referring generally to FIG. 1 and particularly to e.g. FIG. 11, readout 142 comprises first readout 144 configured to display a minimum magnitude value associated with a plurality of signals received by logic circuit 114 from vacuum sensors 112. Readout 142 also comprises second readout 146 configured to display a maximum magnitude value associated with the plurality of signals received by logic circuit 114 from vacuum sensors 112. Readout 142 further comprises third readout 148 configured to display an average magnitude value associated with the plurality of signals received by logic circuit 114 from vacuum sensors 112. The preceding subject matter of this paragraph characterizes example 11 of the present disclosure, wherein example 11 includes the subject matter of example 10, above.

Readout 142 configured to display a minimum magnitude value, a maximum magnitude value, and an average magnitude value permits a worker to quickly ascertain an operating range for vacuum sensors 112 utilized in the testing of suction cups 138.

Example 11 provides a number of exemplary displays provided on readout 142. However, other displayed values are also possible. For example, one or more readout 142 can comprise a divergence value.

Referring generally to FIG. 1 and particularly to e.g. FIG. 11, user interface 134 further comprises mode selector 140 configured to control means 118 for selecting the mode of acquiring signals from vacuum sensors 112. The preceding subject matter of this paragraph characterizes example 12 of the present disclosure, wherein example 12 includes the subject matter of any of examples 9-11, above.

Mode selector 140 permits a worker to choose between measurement modes of acquiring signals. Such a component can permit a worker to test a variety of differing suction cup configurations and/or arrangements. Further, mode selector 140 can allow a worker to test a subset of suction cups 138 or an entire set of suction cups 138.

Any mode selector 140 not inconsistent with the present disclosure can be used. In some implementations, mode selector 140 is a hardware component such as a switch or toggle, although any hardware component operable to select between positions can be used. In certain other implementations, as in FIG. 11, mode selector 140 can be a software component and/or a portion of a user interface 134.

Referring generally to FIG. 1 and particularly to e.g. FIG. 11, apparatus 100 further comprises data acquisition board 120 in communication with vacuum sensors 112 and logic circuit 114. The preceding subject matter of this paragraph characterizes example 13 of the present disclosure, wherein example 13 includes the subject matter of any of examples 2-12, above.

Data acquisition board 120 serves to carry out the process of sampling signals that measure real world conditions and convert the resulting samples into digital numeric values that can be manipulated by logic circuit 114 or the worker. Inclusion of data acquisition board 120 permits acquired signals to be manipulated in a manner ensuring ease of use for the worker.

Data acquisition board 120 can comprise or include any components in any configuration or architecture consistent with carrying out the process of sampling signals that measure real world conditions and convert the resulting samples into digital numeric values. For example, the components of the data acquisition process include sensors, such as vacuum sensors 112, that convert physical parameters to electrical or other signals. Data acquisition further comprises signal conditioning circuitry to convert sensor signals into a form that can be converted to digital values. Such effect can be accomplished through the use of logic circuit 114 or by other components or means. Data acquisition board 120 can be controlled by software other means necessary to acquire data from differing hardware equipment. Data acquisition board 120 can comprise one or more of an analog-to-digital converter (ADC), digital-to-analog converter (D/A), and a general purpose interface bus (GPIB). Data acquisition board 120 can conform to any standards not inconsistent with the objectives of the present disclosure in order to carry out such data acquisition processes.

Referring generally to FIG. 1 and particularly to e.g. FIG. 10, apparatus 100 further comprises sensor boards 122. Vacuum sensors 112 are coupled to sensor boards 122. The apparatus 100 also comprises electrical couplings 125 between sensor boards 122 and logic circuit 114. The preceding subject matter of this paragraph characterizes example 14 of the present disclosure, wherein example 14 includes the subject matter of any of examples 2-13, above.

Sensor boards 122 permit coupling of real world sensors, such as vacuum sensors 112 to logic circuit 114. Such boards can facilitate in any of the above disclosed processes involved in data acquisition and/or manipulation.

Any sensor boards 122 not inconsistent with the objectives of the present disclosure. Further, sensor boards 122 can conform to any standards and/or be configured in any architecture not inconsistent with the objectives of the present disclosure.

Referring generally to FIG. 1 and particularly to e.g. FIG. 9, apparatus 100 further comprises blind slots 126 on first surface 104 of base 102. Blind slots 126 at least partially overlap ports 108. The preceding subject matter of this paragraph characterizes example 15 of the present disclosure, wherein example 15 includes the subject matter of any of examples 1-14, above.

Blind slots 126 can at least partially overlap ports 108 in order to permit the exchange of air or the generation of a vacuum in the event that ports 108 are partially or totally occluded or otherwise sealed. Such a configuration can allow vacuum sensors 112 to work in fluid communication with suction cups 138 even in the event that generation of a vacuum within suction cups 138 causes suction cup collapse.

Although FIG. 9 demonstrates an example in which blind slots 126 fully overlap ports 108, it is to be understood that other configurations are also contemplated. For example, blind slots 126 terminating or ending short of an outer edge of ports 108 can permit fluid flow in the event of partial or total occlusion of ports 108. For at least this reason, partial or complete overlap of blind slots 126 with respect to ports 108 is disclosed herein.

Referring generally to FIG. 1 and particularly to e.g. FIG. 7, geometric pattern 110 is one-dimensional. The preceding subject matter of this paragraph characterizes example 16 of the present disclosure, wherein example 16 includes the subject matter of any of examples 1-15, above.

A one-dimensional geometric pattern 110 permits testing of suction cups 138 arranged in a single line.

A one-dimensional geometric pattern 110 as in FIG. 7 can permit testing of suction cups 138 arranged in a single line (as in FIG. 3) in a configuration wherein vacuum sensors 112 and/or ports 108 are aligned in the same linear direction as at least two suction cups 138.

Referring generally to FIG. 1 and particularly to e.g. FIGS. 6 and 8, geometric pattern 110 is two-dimensional. The preceding subject matter of this paragraph characterizes example 17 of the present disclosure, wherein example 17 includes the subject matter of any of examples 1-15, above.

A two-dimensional geometric pattern 110 permits testing of suction cups 138 arranged in configurations differing from a single line, such as a grid, zig-zag, or other two-dimensional pattern. In other cases, a two-dimensional geometric pattern 110 can permit testing of suction cups 138 arranged in a single dimension, but permitting testing with multiple vacuum sensors 112 per suction cup 138.

A two-dimensional geometric pattern 110 as in FIGS. 6 and 8 can have any pattern not inconsistent with the objectives of the present disclosure. In FIGS. 6 and 8, geometric pattern 110 comprises a grid-like arrangement, however zig-zags, offsets, or other patterns are also possible. Two-dimensional geometric patterns 110 can align vacuum sensors 112 with suction cups 138 a multi-cup arrangement, such as a triple-cup arrangement seen in FIG. 4. Alternatively, the single-cup arrangement seen in FIG. 3 coupled with a two-dimensional geometric pattern 110 can permit multiple sensors per suction cup 138.

Referring generally to FIG. 1, apparatus 100 further comprises pneumatic input connection 128 configured to be coupled to pneumatic power source 130. The preceding subject matter of this paragraph characterizes example 18 of the present disclosure, wherein example 18 includes the subject matter of any of examples 1-17, above.

Pneumatic input connection 128 coupled to pneumatic power source 130 can permit generation of a vacuum at one or more vacuum sensors 112, facilitating testing suction cups 138 under vacuum or partial vacuum conditions.

Any pneumatic input connection 128 can be used not inconsistent with the present disclosure. For example, any suitable combination of hardware or sealant components can be used to maintain pneumatic communication between pneumatic power source 130 and ports 108 and/or vacuum sensors 112.

Referring generally to FIG. 1, apparatus 100 further comprises pneumatic output connection 170 in communication with pneumatic input connection 128. The preceding subject matter of this paragraph characterizes example 19 of the present disclosure, wherein example 19 includes the subject matter of example 18, above.

Pneumatic output connection 170 in communication with pneumatic input connection 128 further facilitates provision of a vacuum or partial vacuum at vacuum sensors 112 for testing conditions.

Any pneumatic output connection 170 can be used not inconsistent with the present disclosure. For example, any suitable combination of hardware or sealant components can be used to maintain pneumatic communication between pneumatic power source 130 and ports 108 and/or vacuum sensors 112.

Referring generally to FIG. 1, apparatus 100 further comprises output generator 150 to generate an output indicative of data collected from vacuum sensors 112. The preceding subject matter of this paragraph characterizes example 20 of the present disclosure, wherein example 20 includes the subject matter of any of examples 1-19, above.

Output generator 150 permits a worker to observe and/or record data collected from vacuum sensors 112.

Any output generator 150 can be used not inconsistent with the present disclosure. For example, output generator 150 can be analog, as in the case of a galvanometer or other analog hardware. Additionally, output generator 150 can comprise or include electronic components such as a display, interface, or other electronic hardware and/or software components.

Referring generally to FIG. 1 and particularly to e.g. FIGS. 5-8, base 102 further comprises first end 180, second end 182 opposite first end 180, and mounting lock 152 coupled to first surface 104 of base 102 at first end 180. The preceding subject matter of this paragraph characterizes example 21 of the present disclosure, wherein example 21 includes the subject matter of any of examples 1-20, above.

Mounting lock 152 coupled to first surface 104 of base 102 at first end 180 permits retention of suction cups 138 to restrict or limit motion of suction cups 138 relative to the apparatus in order to facilitate testing of suction cups 138.

Any hardware or locking assembly can be used not inconsistent with the objectives of the present disclosure. Mounting lock 152 can comprise or include hardware operable to limit motion along at least one direction or axis. For example, mounting lock 152 can restrict movement along the x, y, and/or z axes.

Referring generally to FIG. 1 and particularly to e.g. FIGS. 5-8, mounting lock 152 comprises at least one locking pin 172. Locking pin 172 is one of electrically or pneumatically movable relative to base 102. The preceding subject matter of this paragraph characterizes example 22 of the present disclosure, wherein example 22 includes the subject matter of example 21, above.

Locking pin 172 can be movable relative to base 102 in order to facilitate engagement for testing and disengagement upon completion of testing or prior to placement of suction cups 138 for testing.

Any locking pin 172 can be used. In some implementations, locking pin 172 is electrically actuated upon engagement of a switch or other electronic mode selector. A servo or similar electronic motor can actuate locking pin 172 to actuate between a locked position and an unlocked position. In certain other implementations, locking pin 172 is hydraulically actuatable, such as by a piston or hydraulic cylinder.

Referring generally to FIG. 1 and particularly to e.g. FIGS. 5-8, base 102 further comprises receiver 164 coupled to first surface 104 at second end 182. The preceding subject matter of this paragraph characterizes example 23 of the present disclosure, wherein example 23 includes the subject matter of example 21, above.

Receiver 164 can operate to provide restriction of motion on suction cups 138 mounted to a track. Further, receiver 164 can permit placement of suction cups 138 prior to vacuum generation.

Any receiver 164 can be used. In the implementation illustrated in FIG. 6, a male or locking ball receiver 164 is used, however female receivers are also usable. Any configuration or orientation of receiver 164 permitting restriction of motion while placing suction cups 138 into testing position is suitable for such purpose.

Referring generally to FIG. 1 and particularly to e.g. FIG. 10, base 102 further comprises extensions 154 coupled to second surface 106 of base 102 in fluid communication with ports 108. The preceding subject matter of this paragraph characterizes example 24 of the present disclosure, wherein example 24 includes the subject matter of any of examples 1-23, above.

Extensions 154 coupled to second surface 106 of base 102 in fluid communication with ports 108 can permit generation of a vacuum in suction cups 138.

Extensions 154 illustrated in FIG. 10 are substantially cylindrical, however any form factor or shape can be used. For example, cross-sectional shapes of extensions 154 can vary without impacting the stated function of such extensions 154.

Referring generally to FIG. 1 and particularly to e.g. FIG. 9, apparatus 100 further comprises enclosure 162 coupled to second surface 106 of base 102. The preceding subject matter of this paragraph characterizes example 25 of the present disclosure, wherein example 25 includes the subject matter of any of examples 1-24, above.

Enclosure 162 can serve to protect or shield components disposed adjacent to second surface 106 of base 102.

Although enclosure 162 in FIG. 9 is generally rectangular, any shape or configuration can be used. Additionally, enclosure 162 can fully encase or enclose vacuum sensors 112 or other components or partially encase or enclose vacuum sensors 112 or other components.

Referring generally to FIG. 1, at least one of first surface 104 and second surface 106 is curved. The preceding subject matter of this paragraph characterizes example 26 of the present disclosure, wherein example 26 includes the subject matter of any of examples 1-25, above.

A curved first surface 104 and/or second surface 106 can simulate an environment other than planar in which suction cups 138 are intended to be used. Such a configuration can permit more accurate testing of suction cups 138 in an environment which may replicate in-use conditions.

All or part of first surface 104 and/or second surface 106 can be curved. Additionally, curvature can be concave or convex. In some examples, curvature of first surface 104 and/or second surface 106 can be adapted to replicate or substantially replicate the shape of a vehicle exterior, such as an airplane fuselage or chassis.

Referring generally to FIG. 1 and particularly to e.g. FIG. 5, at least one of first surface 104 and second surface 106 is oblique relative to a horizontal plane. The preceding subject matter of this paragraph characterizes example 27 of the present disclosure, wherein example 27 includes the subject matter of any of examples 1-26, above.

At least one of first surface 104 and second surface 106 being oblique relative to a horizontal plane can permit reduced usage of valuable work space. For example, in a work space where height and floor footprint are limited, disposing at least one of first surface 104 and second surface 106 oblique relative to a horizontal plane can permit angled testing of suction cups 138.

Any angle oblique to a horizontal plane can be used. For example, any angle greater than 0 degrees from horizontal but less than 90 degrees from horizontal can be used. In certain implementations, such oblique angle can be adjusted within a full range of motion such that an angle, $\theta$, is such that $0°<\theta<90°$.

Referring generally to FIG. 1 and particularly to e.g. FIGS. 12A and 12B, a method of testing suction cups 138 mounted on track 162 is disclosed. The method comprises generating a vacuum in at least one of suction cups 138 while fluid-communication paths between suction cups 138 and vacuum sensors 112 concurrently exist. The method further comprises collecting signals from vacuum sensors 112. The preceding subject matter of this paragraph characterizes example 28 of the present disclosure.

Carrying out a method as described in example 28 can permit testing of suction cups 138 mounted on track 162 more efficiently than prior methods. Therefore, worker exertion, testing time, and number of individual worker-initiated measurements are reduced.

"Generating a vacuum," for reference purposes herein, generally refers to removal of air sufficient to cause temporary or permanent reduction in pressure within a suction cup 138. Generating a vacuum, in some instances, refers to generation of a partial vacuum or otherwise reduced pressure system. A vacuum as referred herein need not, but may, refer to removal of all air and/or fluid within at least one suction cup 138. "Fluid communication paths," as referenced herein, generally refer to a path by which fluid may freely transfer in the event that suction cup 138 and one or more corresponding vacuum sensors 112 permit fluid transfer. As such, fluid communication paths indicate that a direct path for fluid transfer exists without sufficient occlusion or blockage which would prevent such transfer. "Signals," as referenced herein, can refer to any digital and/or analog signals receivable from vacuum sensors 112. FIGS. 12A and 12B illustrate steps provided in example 28 after initiation of test sequence (blocks 1200 and 1230), such as at blocks 1202 and 1232.

Referring generally to FIG. 1 and particularly to e.g. FIG. 12B, the fluid-communication paths between suction cups 138 and vacuum sensors 112 comprise a plurality of the fluid-communication paths between one of suction cups 138 and a plurality of vacuum sensors 112. The preceding subject matter of this paragraph characterizes example 29 of the present disclosure, wherein example 29 includes the subject matter of example 28, above.

In implementations wherein the fluid communication paths between suction cups 138 and vacuum sensors 112 comprise a plurality of paths between one of the suction cups 138 and a plurality of vacuum sensors 112, multiple vacuum sensors can measure vacuum within suction cup 138 so as to simultaneously check vacuum as well as check the integrity of vacuum sensors 112.

The configuration referenced in example 29 refers to a "single-cup mode" as outlined in FIG. 12A. Single-cup mode permits measurement from multiple vacuum sensors 112 from a single suction cup 138. In some implementations, a single suction cup 138 can be measured in this manner. In certain other implementations, all suction cups 138 are measured in this manner concurrently or sequentially. In further implementations, a subset of all suction cups 138 are measured in this manner. The method of FIG. 12A can be carried out in full or in part. It is to be understood that the block diagram in FIG. 12A provides but one non-limiting implementation of the method of example 29, and that other means of carrying out such methods are contemplated.

Referring generally to FIG. 1 and particularly to e.g. FIG. 12A, the fluid-communication paths between suction cups 138 and vacuum sensors 112 comprise a single fluid-communication path between one of suction cups 138 and a corresponding one of vacuum sensors 112. The preceding subject matter of this paragraph characterizes example 30 of the present disclosure, wherein example 30 includes the subject matter of example 28, above.

In the configuration described in example 30, individual suction cups 138 are measured singly by individual vacuum sensors 112.

FIG. 12B illustrates one implementation of a method according to example 30 which is intended to measure individual suction cups 138 individually, as may be used for suction cups 138 in the configuration of FIG. 4. It is to be understood that the block diagram in FIG. 12B provides but one non-limiting implementation of the method of example 30, and that other means of carrying out such methods are contemplated.

Referring generally to FIG. 1 and particularly to e.g. FIG. 12A, collecting the signals from vacuum sensors 112 comprises collecting a plurality of the signals from a first one of vacuum sensors 112 and recording magnitude values of the plurality of the signals. Each of the plurality of the signals has a corresponding magnitude value. The preceding subject matter of this paragraph characterizes example 31 of the present disclosure, wherein example 31 includes the subject matter of any of examples 28-30, above.

Recording magnitude values of the plurality of signals from a first one of vacuum sensors 112 permits a worker to review data associated with vacuum sensor 112 associated with one of suction cups 138.

A "magnitude value," as referenced herein, generally indicates any value measured by a sensor such as vacuum sensors 112. A magnitude value recorded according to the plurality of signals can have any unit not inconsistent with the objectives of the present disclosure or, in some implementations, may represent a unitless value. Collecting a plurality of signals is illustrated in FIG. 12A at block 1204. Recording corresponding magnitude values is illustrated at block 1206.

Referring generally to FIG. 1 and particularly to e.g. FIG. 12A, the method further comprises comparing the corresponding magnitude value of each of the plurality of the signals from the first one of vacuum sensors 112 to a performance threshold. The preceding subject matter of this paragraph characterizes example 32 of the present disclosure, wherein example 32 includes the subject matter of example 31, above.

Comparison of magnitude values to a performance threshold permits a worker to determine if suction cups 138 are outside of normal operating ranges. Further, comparison of magnitude values to a performance threshold permits a worker to determine if vacuum sensors 112 are operating outside of tolerance. For example, a magnitude value outside of a performance threshold corresponding to possible values can indicate to the worker that the vacuum sensor requires repair or recalibration.

A "performance threshold," as referenced herein, can refer to a single value or a range of values. For example, a performance threshold can indicate a single value above which or below which a magnitude value is determined to be unacceptable. Additionally, a magnitude value above or below such a value can indicate that one of vacuum sensors 112 is inoperable or calibrated incorrectly. In certain other implementations, a performance threshold refers to a range of values having a minimum performance threshold value and a maximum performance threshold value. A magnitude value falling below the minimum performance threshold value or above the maximum performance threshold value would therefore be deemed outside of the performance threshold.

Referring generally to FIG. 1 and particularly to e.g. FIG. 12A, the method further comprises generating an error message if the corresponding magnitude value of each of the plurality of the signals from the first one of vacuum sensors 112 is outside the performance threshold. The preceding subject matter of this paragraph characterizes example 33 of the present disclosure, wherein example 33 includes the subject matter of example 32, above.

Generation of an error message in such conditions indicates to the worker that one or more vacuum sensors 112 and/or suction cups 138 may require repair and/or recalibration.

Any error message display method can be used. In some implementations, an error message is a software display. In certain other implementations, an error message refers to a signal or other indicator, hardware or software indicated, intended to indicate to the worker that one or more magnitude values are outside of the performance threshold. Comparing magnitude values to a performance threshold is illustrated in FIG. 12 at block 1208. Generation of an error message is illustrated at block 1212.

Referring generally to FIG. 1 and particularly to e.g. FIG. 12A, the method further comprises calculating a mean value of the magnitude values of the plurality of the signals from the first one of vacuum sensors 112 to obtain a mean magnitude value. Additionally, the method comprises calculating a divergence of the magnitude values from the mean magnitude value to obtain a single-sensor divergence value for the first one of vacuum sensors 112. The method further comprises comparing the single-sensor divergence value for the one of vacuum sensors 112 to a single-sensor divergence threshold. The preceding subject matter of this paragraph characterizes example 34 of the present disclosure, wherein example 34 includes the subject matter of any of examples 31-33, above.

Calculating a mean value and a divergence value can assist an operator in determining whether vacuum sensors 112 and/or suction cups 138 are operating consistently over a period of time in which measurements are taken.

A "divergence," as referenced herein, indicates a calculated difference for a particular sample set from the mean. A divergence can comprise or include a standard deviation, a variance, or any other mathematical or numerical representation of divergence from the mean for the sample set. A "divergence threshold," as referenced herein, can refer to a single value or a range of values. For example, a divergence threshold can indicate a single value above which or below which a divergence value is determined to be unacceptable. Additionally, a divergence value above or below such a threshold can indicate that one of vacuum sensors 112 is inoperable or calibrated incorrectly. In certain other implementations, a divergence threshold refers to a range of values having a minimum divergence threshold value and a maximum divergence threshold value. A divergence value falling below the minimum divergence threshold value or above the maximum divergence threshold value would therefore be deemed outside of the divergence threshold. Calculating a mean magnitude value of magnitude values is illustrated in FIG. 12A at block 1214. Calculating a divergence of the magnitude values from the mean magnitude value is illustrated at block 1216. Comparing the single-sensor divergence value is illustrated at blocks 1218 and 1220.

Referring generally to FIG. 1 and particularly to e.g. FIG. 12A, the method further comprises displaying a performance indicator based on comparing the single-sensor divergence value for the first one of vacuum sensors 112 to the single-sensor divergence threshold. The preceding subject matter of this paragraph characterizes example 35 of the present disclosure, wherein example 35 includes the subject matter of example 34, above.

Display of a performance indicator can signal to the worker the status of one or more vacuum sensors 112 and/or suction cups 138.

A performance indicator can refer to any display, whether displayed through hardware or software, intended and operable to signify to a worker the status or performance level of a portion of apparatus 100. For example, a performance indicator can comprise or include a color, numerical signal, text signal, or other display indicating the performance of vacuum sensors 112 and/or suction cups 138.

Referring generally to FIG. 1 and particularly to e.g. FIGS. 12A and 12B, collecting the signals from vacuum sensors 112 comprises collecting a plurality of the signals from each of vacuum sensors 112 and recording magnitude values of the plurality of the signals. Each of the plurality of the signals has a corresponding magnitude value. The preceding subject matter of this paragraph characterizes example 36 of the present disclosure, wherein example 36 includes the subject matter of any of examples 28-30, above.

Recording magnitude values of the plurality of signals from a first one of vacuum sensors 112 permits a worker to review data associated with vacuum sensor 112 associated with one of suction cups 138.

Collecting a plurality of signals from each of vacuum sensors 112 indicates that multiple samples or tests are performed for individual vacuum sensors 112. As used herein, the term "each" used to modify vacuum sensors 112 indicates that individual vacuum sensors 112 are referenced, and may indicate all individual vacuum sensors 112 or a subset of all individual vacuum sensors 112. Collecting a plurality of signals is illustrated in FIG. 12A at block 1204. Recording corresponding magnitude values is illustrated at block 1206.

Referring generally to FIG. 1 and particularly to e.g. FIGS. 12A and 12B, the method further comprises comparing the corresponding magnitude value of each of the plurality of the signals from each of vacuum sensors 112 to a performance threshold. The preceding subject matter of this paragraph characterizes example 37 of the present disclosure, wherein example 37 includes the subject matter of example 36, above.

Comparison of magnitude values to a performance threshold permits a worker to determine if suction cups 138 are outside of normal operating ranges. Further, comparison of magnitude values to a performance threshold permits a worker to determine if vacuum sensors 112 are operating outside of tolerance. For example, a magnitude value outside of a performance threshold corresponding to possible values can indicate to the worker that the vacuum sensor requires repair or recalibration.

Referring generally to FIG. 1 and particularly to e.g. FIGS. 12A and 12B, the method further comprises generating an error message if the corresponding magnitude value of each of the plurality of the signals from each of vacuum sensors 112 is outside the performance threshold. The preceding subject matter of this paragraph characterizes example 38 of the present disclosure, wherein example 38 includes the subject matter of example 37, above.

Generation of an error message in such conditions indicates to the worker that one or more vacuum sensors 112 and/or suction cups 138 may require repair and/or recalibration.

Comparing magnitude values to a performance threshold is illustrated in FIG. 12 at block 1208. Generation of an error message is illustrated at block 1212.

Referring generally to FIG. 1 and particularly to e.g. FIG. 12A, the method further comprises calculating a mean value of the magnitude values of the plurality of the signals from each of vacuum sensors 112 to obtain a mean magnitude value. The method additionally comprises calculating a divergence of the magnitude values from the mean magnitude value to obtain a single-sensor divergence value for each of vacuum sensors 112. The method further comprises comparing the single-sensor divergence value for each of vacuum sensors 112 to a single-sensor divergence threshold. The preceding subject matter of this paragraph characterizes example 39 of the present disclosure, wherein example 39 includes the subject matter of any of examples 36-38, above.

Calculating a mean value and a divergence value can assist an operator in determining whether vacuum sensors 112 and/or suction cups 138 are operating consistently over a period of time in which measurements are taken.

Calculating a mean magnitude value of magnitude values is illustrated in FIG. 12A at block 1214. Calculating a divergence of the magnitude values from the mean magnitude value is illustrated at block 1216. Comparing the single-sensor divergence value is illustrated at blocks 1218 and 1220.

Referring generally to FIG. 1 and particularly to e.g. FIG. 12A, the method further comprises displaying performance indicators based on comparing the single-sensor divergence value for each of vacuum sensors 112 to the single-sensor divergence threshold. The preceding subject matter of this paragraph characterizes example 40 of the present disclosure, wherein example 40 includes the subject matter of example 39, above.

Display of a performance indicator can signal to the worker the status of one or more vacuum sensors 112 and/or suction cups 138.

Displaying a performance indicator is illustrated at block 1224 of FIG. 12A.

Referring generally to FIGS. 1, 12A, and 12B, the performance indicators for all of vacuum sensors 112 are displayed concurrently. The preceding subject matter of this paragraph characterizes example 41 of the present disclosure, wherein example 41 includes the subject matter of example 40, above.

Concurrent display can provide the worker with a single point of reference upon which all measured signals can be compared.

Referring generally to FIG. 1 and particularly to e.g. FIG. 12B, collecting the signals from vacuum sensors 112 comprises collecting a first plurality of the signals from a first one of vacuum sensors 112 in fluid communication with a first one of suction cups 138 and recording first magnitude values of the first plurality of the signals. Each of the first plurality of the signals has a corresponding first magnitude value. Collecting the signals from vacuum sensors 112 further comprises collecting a second plurality of the signals from a second one of vacuum sensors 112 in fluid communication with the first one of suction cups 138 and recording second magnitude values of the second plurality of the signals. Each of the second plurality of the signals has a corresponding second magnitude value. The preceding subject matter of this paragraph characterizes example 42 of the present disclosure, wherein example 42 includes the subject matter of example 28, above.

Upon performance of such method, multiple sets of magnitude values are recorded for individual sensors. In this manner, manipulation of the separate sets of values can permit comparison within a set for a single vacuum sensor 112 or between sets of vacuum sensors 112 in order to compare readings as an internal control.

In FIG. 12B, collecting a first plurality of signals and a second plurality of signals is illustrated at block 1234. Recording first magnitude values and second magnitude values is illustrated at block 1236.

Referring generally to FIG. 1 and particularly to e.g. FIG. 12B, the method further comprises calculating a mean value of the first magnitude values of the first plurality of the signals from the first one of vacuum sensors 112 to obtain a first mean magnitude value and a mean value of the second magnitude values of the second plurality of the signals from the second one of vacuum sensors 112 to obtain a second mean magnitude value. The method also comprises calculating a mean of the first mean magnitude value and the second mean magnitude value to obtain a multi-sensor mean magnitude value. Additionally, the method comprises calculating a divergence of the first magnitude values and the second magnitude values from the multi-sensor mean magnitude value to obtain a multi-sensor divergence value for the first one of vacuum sensors 112 and the second one of vacuum sensors 112. The method further comprises comparing the multi-sensor divergence value to a multi-sensor divergence threshold. The preceding subject matter of this paragraph characterizes example 43 of the present disclosure, wherein example 43 includes the subject matter of example 42, above.

Calculating the means of individual sets of magnitude values taken from individual sensors, using these means to then calculate a multi-sensor mean magnitude value, and then calculating a divergence from this multi-sensor mean magnitude value permits a worker to determine divergence within one of suction cups 138. This allows the worker to determine if divergence is outside of the divergence threshold, indicating that issues may exist within vacuum sensors 112 and/or suction cups 138 which may require repair and/or recalibration.

Calculating a mean value of first magnitude values, a mean value of second magnitude values, and a mean calculation to obtain a multi-sensor mean magnitude value are steps illustrated at block 1244 of FIG. 12B. Calculation to obtain a multi-sensor divergence value is illustrated at block 1246. Comparison of the multi-sensor divergence value to a multi-sensor divergence threshold is illustrated at block 1248.

Referring generally to FIG. 1 and particularly to e.g. FIG. 12B, the method further comprises generating an error message if the multi-sensor divergence value is outside the multi-sensor divergence threshold. The preceding subject matter of this paragraph characterizes example 44 of the present disclosure, wherein example 44 includes the subject matter of example 43, above.

Generation of an error message in such conditions indicates to the worker that one or more vacuum sensors 112 and/or suction cups 138 may require repair and/or recalibration.

Generation of an error message is illustrated in FIG. 12B at block 1252.

Examples of the present disclosure may be described in the context of aircraft manufacturing and service method 1100 as shown in FIG. 14 and aircraft 1102 as shown in FIG. 12. During pre-production, illustrative method 1100 may include specification and design block (1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

FIG. 15 illustrates a block diagram of a computer or operable to carry out one or more steps of methods disclosed herein. Computer 1500 comprises several internal components to carries out the instructions of a computer program by performing the basic arithmetic, logical, control and input/output (I/O) operations specified by the instructions. Computer 1500 comprises mass storage 1528, random access memory 1514, read only memory 1516, and processor 1512 or central processing unit comprising local memory 1513. Computer 1500 also comprises means or structure operable to control input and output such as input device(s) 1522, which may connected to interface 1520. Interface 1520 can be connected to output device(s) in order to deliver visual or hardware output. Interface 1520 can also be connected to network 1526 which may connect computer 1500 with other hardware or software devices suitable for use with methods described herein.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for testing a plurality of suction cups mounted on a track the apparatus comprising:
   a base comprising a first surface and a second surface opposite the first surface
   a plurality of ports penetrating the base from the first surface to the second surface, wherein the plurality of ports in the base are arranged in a geometric pattern; and
   a plurality of vacuum sensors pneumatically coupled to the plurality of ports.

2. The apparatus of claim 1 further comprising a logic circuit in communication with the plurality of vacuum sensors.

3. The apparatus of claim 2 further comprising means for causing the logic circuit to select a mode of receiving signals from the plurality of vacuum sensors.

4. The apparatus of claim 3, wherein the mode of receiving signals from the plurality of vacuum sensors is one of:
   receiving signals from at least two of the plurality of vacuum sensors in fluid communication with one of the plurality of suction cups, or
   receiving signals from the plurality of vacuum sensors with each of the plurality of vacuum sensors in fluid communication with a single one of the plurality of suction cups.

5. The apparatus of claim 3 further comprising a visual indicator in communication with the logic circuit, wherein the visual indicator is configurable responsive to at least one signal received by the logic circuit from at least one of the plurality of vacuum sensors.

6. The apparatus of claim 5, wherein the visual indicator comprises components individually configurable to one of a plurality of states responsive to the at least one signal received by the logic circuit from the at least one of the plurality of vacuum sensors.

7. The apparatus of claim 5 further comprising a user interface, wherein the visual indicator is an element of the user interface.

8. The apparatus of claim 7, wherein the user interface further comprises a mode selector configured to control the means for selecting the mode of acquiring signals from the plurality of vacuum sensors.

9. The apparatus of claim 1 further comprising blind slots on the first surface of the base, wherein the blind slots at least partially overlap the plurality of ports.

10. The apparatus of claim 1, wherein the base further comprises a first end, a second end opposite the first end, and a mounting lock coupled to the first surface of the base at the first end.

11. The apparatus of claim 10, wherein the base further comprises a receiver coupled to the first surface at the second end.

12. A method of testing a plurality of suction cups mounted on a track, the method comprising:
   generating a vacuum in at least one of the plurality of suction cups while a plurality of fluid-communication paths between the plurality of suctions cups and a plurality of vacuum sensors concurrently exist; and
   collecting signals from the plurality of vacuum sensors.

13. The method of claim 12, wherein the plurality of fluid-communication paths between the plurality of suction cups and the plurality of vacuum sensors comprise two or more of the plurality of fluid-communication paths between one of the plurality of suction cups and two or more of the plurality of vacuum sensors.

14. The method of claim 12, wherein the plurality of fluid-communication paths between the plurality of suction cups and the plurality of vacuum sensors comprise one of the plurality of fluid-communication paths between one of the plurality of suction cups and a corresponding one of the plurality of vacuum sensors.

15. The method of claim 12, wherein:
   collecting the signals from the plurality of vacuum sensors comprises collecting a plurality of the signals from each of the plurality of vacuum sensors and recording magnitude values of the plurality of the signals, and
   each of the plurality of the signals has a corresponding magnitude value.

16. The method of claim 15 further comprising comparing the corresponding magnitude value of each of the plurality of the signals from each of the plurality of vacuum sensors to a performance threshold.

17. The method of claim 16 further comprising generating an error message if the corresponding magnitude value of each of the plurality of the signals from each of the plurality of vacuum sensors is outside the performance threshold.

18. The method of claim 15 further comprising:
   calculating a mean value of the magnitude values of the plurality of the signals from each of the plurality of vacuum sensors to obtain a mean magnitude value;
   calculating a divergence of the magnitude values from the mean magnitude value to obtain a single-sensor divergence value for each of the plurality of vacuum sensors; and
   comparing the single-sensor divergence value for each of the plurality of vacuum sensors to a single-sensor divergence threshold.

19. The method of claim 18 further comprising displaying performance indicators based on comparing the single-sensor divergence value for each of the plurality of vacuum sensors to the single-sensor divergence threshold.

20. The method of claim 12, wherein:
   collecting the signals from the plurality of vacuum sensors comprises collecting a first plurality of the signals from a first one of the plurality of vacuum sensors in fluid communication with a first one of the plurality of suction cups and recording first magnitude values of the first plurality of the signals,
   each of the first plurality of the signals has a corresponding first magnitude value,
   collecting the signals from the plurality of vacuum sensors further comprises collecting a second plurality of the signals from a second one of the plurality of vacuum sensors in fluid communication with the first one of the plurality of suction cups and recording second magnitude values of the second plurality of the signals, and
   each of the second plurality of the signals has a corresponding second magnitude value.

21. The method of claim 20 further comprising:
   calculating a mean value of the first magnitude values of the first plurality of the signals from the first one of the plurality of vacuum sensors to obtain a first mean magnitude value and a mean value of the second magnitude values of the second plurality of the signals from the second one of the plurality of vacuum sensors to obtain a second mean magnitude value;
   calculating a mean of the first mean magnitude value and the second mean magnitude value to obtain a multi-sensor mean magnitude value;
   calculating a divergence of the first mean magnitude value and the second mean magnitude value from the multi-sensor mean magnitude value to obtain a multi-sensor divergence value for the first one of the plurality of vacuum sensors and the second one of the plurality of vacuum sensors; and comparing the multi-sensor divergence value to a multi-sensor divergence threshold.

* * * * *